United States Patent
Yonekawa

(10) Patent No.: US 6,818,905 B2
(45) Date of Patent: Nov. 16, 2004

(54) RADIATION IMAGE RADIOGRAPHING CASSETTE AND RADIATION IMAGE READING APPARATUS

(75) Inventor: Hisashi Yonekawa, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/789,013

(22) Filed: Feb. 27, 2004

(65) Prior Publication Data

US 2004/0164252 A1 Aug. 26, 2004

Related U.S. Application Data

(62) Division of application No. 09/999,470, filed on Nov. 15, 2001.

(30) Foreign Application Priority Data

Nov. 20, 2000 (JP) ........................................ 2000-396245
Nov. 20, 2000 (JP) ........................................ 2000-396246

(51) Int. Cl.[7] .............................................. G03B 42/08
(52) U.S. Cl. ................................... 250/484.4; 250/589
(58) Field of Search ................................ 250/581, 584, 250/586, 588, 589, 590, 484.4

(56) References Cited

U.S. PATENT DOCUMENTS 5,025,156 A   6/1991  Ohgoda
5,751,001 A * 5/1998  Verbeke .................... 250/484.4

FOREIGN PATENT DOCUMENTS

JP    01-237636 A    9/1989
JP    11-160821 A    6/1999

* cited by examiner

Primary Examiner—Constantine Hannaher
Assistant Examiner—Timothy Moran
(74) Attorney, Agent, or Firm—Frishauf, Holtz, Goodman & Chick, P.C.

(57) ABSTRACT

A radiation image reading apparatus for reading a radiation image information from a stimulable phosphor sheet attached to a back base of a cassette comprised of an inlet through which the cassette is inserted, a separator to separate the front cover and the back base of the cassette, a vertical scanner, an image reader to read radiation image information, an eraser to erase the remaining radiation image information, a re-assembling section to re-assemble the front cover and the back base again, an outlet, and a conveyer to move the cassette, wherein the conveyer moves the cassette with at least a rotational displacement.

14 Claims, 15 Drawing Sheets

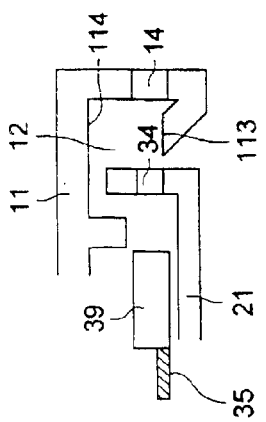
FIG. 3 (A2a)  FIG. 3 (A2b)
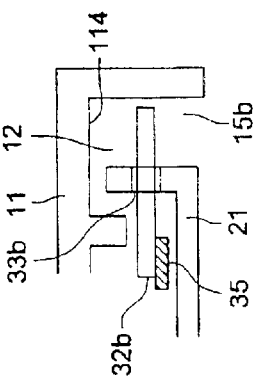
FIG. 3 (B2a)  FIG. 3 (B2b)
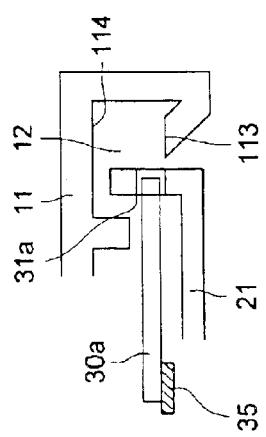
FIG. 3 (A1a)  FIG. 3 (A1b)
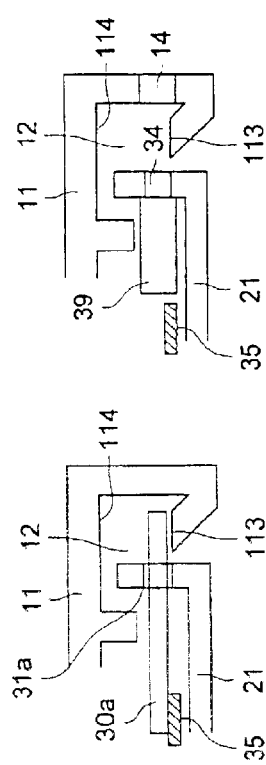
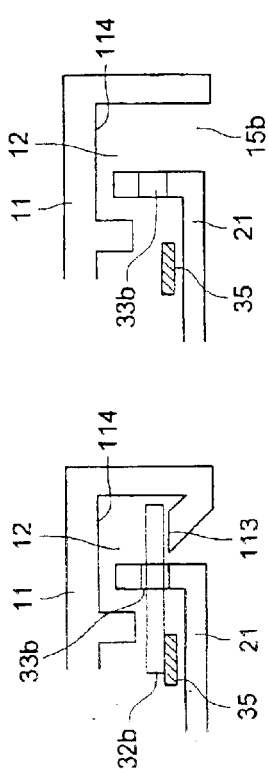
FIG. 3 (B1a)  FIG. 3 (B1b)

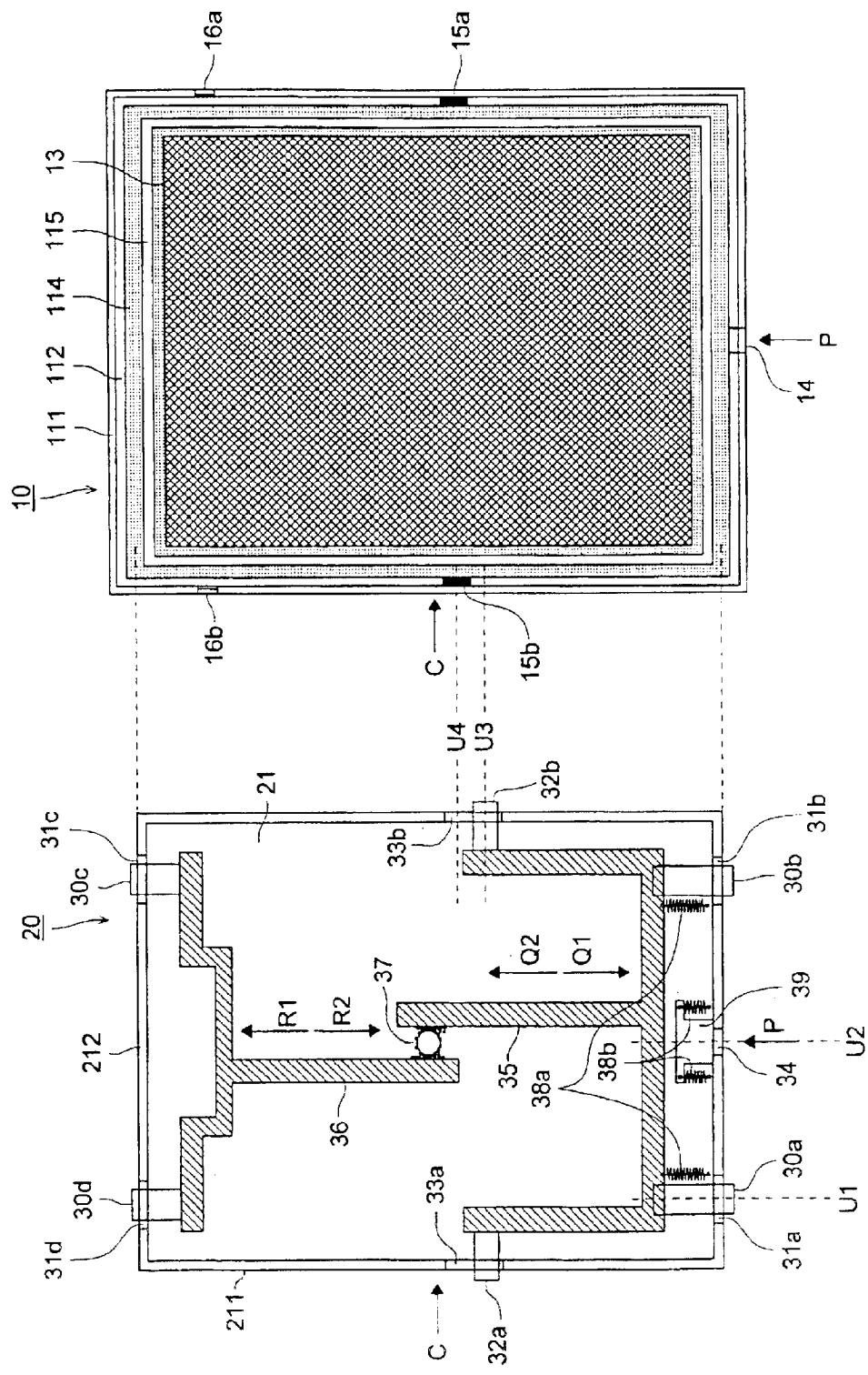

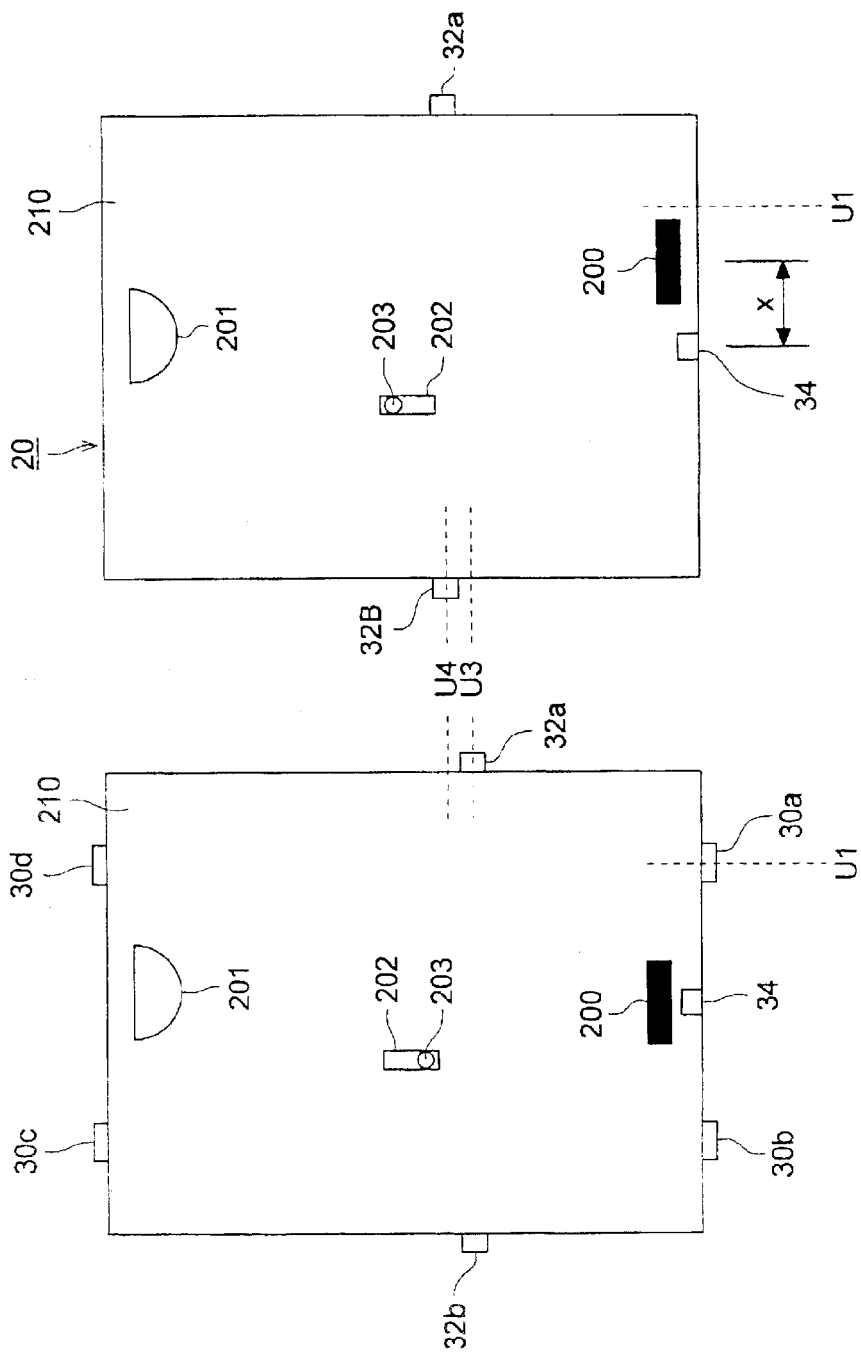

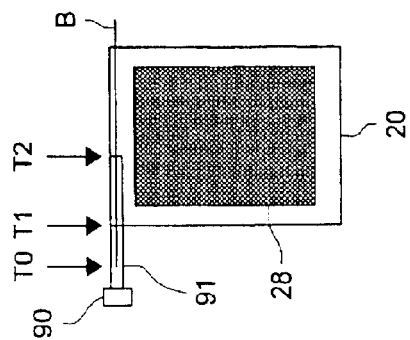
FIG. 10 (A1)
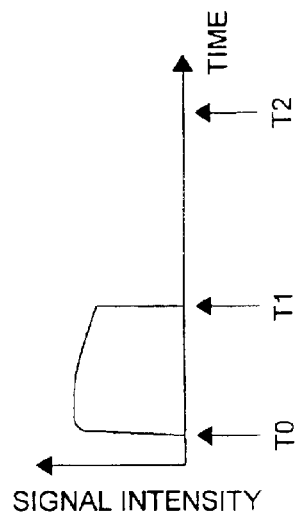
FIG. 10 (B1)
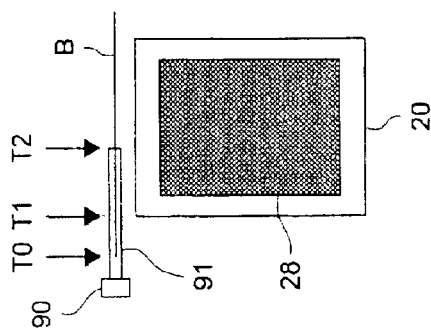
FIG. 10 (A2)
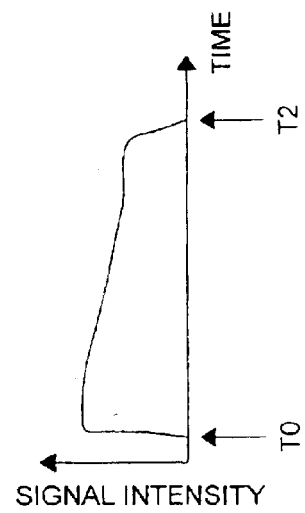
FIG. 10 (B2)

RADIATION IMAGE RADIOGRAPHING CASSETTE AND RADIATION IMAGE READING APPARATUS

CROSS-REFERENCE TO RELATED APPLICATION

The present application is a divisional application of U.S. application Ser. No. 09/999,470, filed Nov. 15, 2001.

BACKGROUND OF THE INVENTION

The present invention relates to a radiation image radiographing cassette housing therein a stimulable phosphor sheet and to a radiation image reading apparatus that reads radiation image information accumulated in the stimulable phosphor sheet.

For digitizing radiation image information generated in a hospital and thereby for storing and transmitting it, there has become popular a radiation image reading apparatus which outputs image data as digital data. As a radiation image reading apparatus of this kind outputting digital data, a radiation image reading apparatus employing a stimulable phosphor sheet is known well.

The stimulable phosphor sheet can detect a part of radiation energy transmitted through a subject and can accumulate radiation energy thus detected in the stimulable phosphor sheet. Further, it is possible to take out the radiation energy accumulated in the stimulable phosphor sheet as stimulated light, by exciting it with a laser beam having a prescribed wavelength. This stimulated light can be taken out as an electric signal by a photoelectric transfer element such as a photomultiplier.

In general, the stimulable phosphor sheet is housed in a casing that is a portable thin box called a cassette, to be used. The form of usage of this type makes it possible for a user to carry the stimulable phosphor sheet easily together with a cassette, thus, radiographing can be conducted through the same handling as for a screen/film type cassette which has been used in the past.

As a method for handling a stimulable phosphor sheet, there is known well a contact conveyance method wherein a flexible stimulable phosphor sheet is taken out by a sucker from a cassette, and the stimulable phosphor sheet thus taken out is interposed between rollers to be conveyed, as disclosed in TOKKAIHEI No. 1-237636. Since a stimulable phosphor surface is pressed by rollers in the contact conveyance method, when rollers are contaminated with dirt or dust, the phosphor surface is contaminated or scratched and a life of a stimulable phosphor sheet is shortened, which is a fatal weak point. Further, a scratch or dirt on the stimulable phosphor surface appears as a noise in the image read, and it makes it impossible to provide quality images as diagnostic images.

As a method to solve the weak point of the contact conveyance method, there is proposed a method shown in TOKKAIHEI No. 11-160821. In this method, a stimulable phosphor sheet is stuck on a rigid sheet member, and the stimulable phosphor sheet and the rigid sheet member are conveyed through the method wherein only the rigid sheet member comes in contact (the stimulable phosphor surface does not come in contact). The method to convey the stimulable phosphor sheet without touching the stimulable phosphor surface is called a non-contact conveyance method.

In this non-contact conveyance method, the stimulable phosphor surface is neither contaminated nor scratched, because conveyance under the condition of non-contact with the stimulable phosphor surface is assured. Therefore, the non-contact conveyance method is observed as a new conveyance method for stimulable phosphor sheets because it has a merit that a noise caused by dirt or a scratch on the stimulable phosphor surface does not appear on the image read, and a life of the stimulable phosphor sheet is long.

However, in the case of the non-contact conveyance method, it is difficult to convey a stimulable phosphor plate under the condition that it is curved to a certain extent as in a contact conveyance method, because the stimulable phosphor sheet is generally required to be conveyed under the condition that it is stuck on a rigid sheet member. Namely, what is conducted by the contact conveyance method is only a linear conveyance at all times.

In the non-contact conveyance method, there is considered a method to read image information while drawing out a stimulable phosphor plate from a cassette. This method, however, has a weak point that a vibration caused by contact is transferred to a stimulable phosphor plate that is in process of reading operation if a user comes in contact with a cassette in the course of reading, and thereby, a noise is generated in the image read. In the non-contact conveyance method, in particular, the stimulable phosphor surface is easily subjected to vibration compared with the contact conveyance method because it is impossible to control vibration by interposing the surface of the stimulable phosphor sheet with rollers. In particular, a rigid sheet member on which a stimulable phosphor sheet is stuck propagates vibrations well, which is more undesirable. In the non-contact conveyance method, therefore, it is necessary to read image information after a stimulable phosphor plate has been taken out of a cassette completely.

A size of a stimulable phosphor sheet amounts to 354×430 mm in the case of a size of 14×17 in. A non-contact conveyance method has a weak point that an apparatus needs to be large in size, because a sheet in the aforesaid size is required to be conveyed without being curved after it has been taken out of a cassette completely. For example, in the case of a cassette in a size of 14×17 in., when there is assumed an occasion wherein a stimulable phosphor sheet is drawn out of a cassette linearly, and then, image information is read while the linear conveyance of the sheet is maintained, a distance from the rear end of the cassette to the front end of the stimulable phosphor sheet needs to be a length equivalent to three cassettes each being in a size of 14×17 in. (430 mm×3=1290 mm), and if an area for parts and a space which are necessary for constituting an apparatus are further taken into consideration, the apparatus turns out to be considerably large in size.

Therefore, there has been proposed a method wherein a stimulable phosphor sheet is drawn out downward, and then, is subjected to parallel displacement in the horizontal direction (direction perpendicular to the surface of the stimulable phosphor sheet), as in TOKKAIHEI No. 11-160821. However, a mechanism for accurate parallel displacement for the large-sized sheet is extremely complicated, and it results in a cost increase. Further, there is a weak point that reliability and stability are lowered fundamentally, because accurate parallel displacement for the large-sized sheet itself is an unreasonable demand.

There are two types of the radiation image reading apparatuses; one is the large sized apparatus that can accept a plurality of cassettes at a time, and the other is small sized apparatus that can accept only one cassette. The large type has demerits of occupying a large space and high cost, on the contrary, the small type has a poor efficiency due to that only one cassette can be accepted. Generally, in one radiographing examination 1 to 5 cassettes, 1.8 cassettes in average, are used, therefore, unless 2 cassettes in minimum can be accepted at a time by the radiographing apparatus, working efficiency will be remarkably decreased.

Further, in order to read the radiation image information from the stimulable phosphor sheet, a conveyance of the stimulable phosphor sheet, the cassette holding the stimulable phosphor sheet, or a part of the cassette holding the stimulable phosphor sheet is necessary. However, if an abnormality in the conveyance such as a jam occurs in the process of conveying the stimulable phosphor sheet, the cassette holding the stimulable phosphor sheet, or a part of the cassette holding the stimulable sheet, there may be a case where the conveyance cannot be continued and the apparatus have to be stopped.

Regarding the apparatus used at the medical service site, when the apparatus stopped due to abnormal conveyance, it is required not only notifying the user of the occurrence of the conveyance abnormality, but also immediately clearing the abnormality to return to be usable again. If the apparatus is kept stopped, a radiographing diagnosis for an emergent patient cannot be conducted and the following medical services cannot be continued.

However, in the conventional radiation image reading apparatus using the stimulable phosphor plate, this kind of recovery work is restricted to a service person. And, when an abnormality in conveyance occurs, the user calls the service person, and has to stop the radiographing diagnosis until the service person arrives and recovers.

In cases of copiers and printers, it is commonly known to install a user maintenance mechanism with which users can clear the jams when output paper jammed, though, in the radiation image reading apparatuses, this kind of user maintenance mechanism is not realized. As the reasons, the following things can be considered.

1) In the cases of copiers and printers, as the output paper is inexpensive, it may be allowable even if the output paper is broken or damaged to be unusable, (re-output can be done), but in the case of the radiation image reading apparatuses, because the stimulable phosphor sheet is very expensive, breakages or damages to be unusable can not be allowed. By this restriction, to constitute the user maintenance mechanism in the radiation image reading apparatus is difficult.

2) In the cases of copiers and printers, when the output paper jammed, copying or printing out can be made again. On the other hand, in the stimulable phosphor sheet being used for the radiation image reading apparatus, there is accumulated image information of a patient, therefore, when the stimulable phosphor sheet is damaged to be unusable, it is necessary to take another radiographing, which is extremely undesirable because the patient receives unnecessary exposure of radiation.

In a cassette of a type shown in TOKKAIHEI No.11-160821, there is a problem that the rigid sheet tends to vibrate in a drum shape, because image information is read from the stimulable phosphor sheet under the condition that only both ends of the rigid sheet on which the stimulable phosphor sheet is stuck are fixed (and a surface potion of the rigid sheet is not supported). Therefore, there is easily caused a trouble that a noise caused by vibration of the rigid sheet is mixed in the image read.

The invention has been attained in view of the background stated above, and its object is to provide a radiation image radiographing cassette that is optimum for the non-contact conveyance method wherein troubles hardly occur, and to provide a radiation image radiographing cassette that is hardly affected by vibration in the course of reading and has the strong structure that can stand sufficiently a load from the front cover side of the cassette, and further to provide a radiation image reading apparatus that has a small size, a low cost, high reliability, high stability and high working efficiency.

SUMMARY OF THE INVENTION

The invention is structured as follows for solving the problems mentioned above and for attaining the objects.

Structure (1)

A radiation image radiographing cassette having a front cover and a back base wherein the cassette can take two conditions including one in which the front cover and the back base are separated from each other and the other in which the front cover and the back base are re-assembled together, a stimulable phosphor sheet or a sheet member on which the stimulable phosphor sheet is stuck or absorbed directly or indirectly on an inner surface of the back base, and the back base has appropriate stiffness and has appropriate flexibility which makes the flatness of the back base to follow the flatness of another plane stated above when the back base is absorbed on another plane by a prescribed means.

In the structure (1), the cassette can take two conditions including one in which the front cover and the back base are separated from each other and the other in which the front cover and the back base are re-assembled together, a stimulable phosphor sheet or a sheet member on which the stimulable phosphor sheet is stuck on or absorbed in an inner surface of the back base, and the back base has appropriate stiffness and has appropriate flexibility which makes the flatness of the back base to follow the flatness of another plane (flatness of the back base is corrected by flatness of another plane) when the back base is absorbed on another plane by a prescribed means, and therefore, it is possible to read image information from the stimulable phosphor sheet having excellent flatness, by separating the back base from the front cover and by making the back base to be absorbed in another plane. Due to this, image unevenness caused by a decline of flatness of the stimulable phosphor sheet is not generated, and quality images for diagnosis can be provided. It is further possible to provide a non-contact conveyance method wherein the surface of a stimulable phosphor sheet is not touched, in a more preferable form.

Further, the back base whose entire surface is absorbed on another plane on which a measure to prevent vibration is taken eliminates that the stimulable phosphor surface vibrates in the course of reading image information from the stimulable phosphor sheet, and therefore, it is possible to eliminate image unevenness generated when the stimulable phosphor surface vibrates in the course of reading image information from the stimulable phosphor sheet, and thereby to provide quality images for diagnosis.

Compared with a method to draw out a rigid stimulable phosphor plate from the side of a cassette, a method to separate the front cover from the back base and to re-assemble them together requires the conveyance mechanism to have lower accuracy for conveyance, and therefore, it is possible to provide an apparatus wherein frequency of occurrence of troubles is low and stability and reliability are high.

Further, since a frame of the front cover is of the structure to cover continuously the peripheral on the front side of the front cover, it is possible to provide a strong cassette which is extremely strong for the load applied on the front cover of the cassette in the course of radiographing.

Structure (2)

The radiation image radiographing cassette described in (1) wherein at least a part of the reverse side of the back base is a ferromagnetic body, and attraction of the back base to another plane is one by means of magnetic force.

In the structure (2), at least a part of the reverse side is a ferromagnetic body, and an arrangement is made so that the back base may be attracted to another plane by magnetic force, therefore, it is possible to provide an inexpensive apparatus that operates stably, without using a complicated mechanism.

Structure (3)

The radiation image radiographing cassette described in (1) wherein attraction of the back base to another plane is sticking by means of vacuum or the like.

The structure (3) makes is possible to provide an apparatus which can operate stably without using a complicated mechanism, because an arrangement is made so that the back base may be attracted to another plane by means of vacuum and others. Further, by canceling the attraction by means of vacuum or the like, the back base can be removed from another plane easily.

Structure (4)

The radiation image radiographing cassette described in (1) wherein the stimulable phosphor sheet or the sheet member on which the stimulable phosphor sheet is adhering is stuck on the inner surface of the back base by a two-sided adhesive tape or by adhesives on a sticking-changeable basis.

In the structure (4), an arrangement is made so that the stimulable phosphor sheet or the sheet member on which the stimulable phosphor sheet is adhering is stuck on the inner surface of the back base by a two-sided adhesive tape or by adhesives on a sticking-changeable basis. Therefore, there is no fear that the stimulable phosphor sheet comes off the back base in the course of reading image information from the stimulable phosphor sheet. Further, there is no fear that the stimulable phosphor sheet comes off the back base, even in the case of usage for a long time. Therefore, a highly reliable cassette can be provided. It is further possible to replace stimulable phosphor sheets.

Structure (5)

The radiation image radiographing cassette described in (1) wherein the stimulable phosphor sheet or the sheet member on which the stimulable phosphor sheet is adhering is attracted to the inner surface of the back base by magnetic force.

In the structure (5), an arrangement is made so that the stimulable phosphor sheet or the sheet member on which the stimulable phosphor sheet is adhering is attracted to the inner surface of the back base by magnetic force. It is therefore possible to replace stimulable phosphor sheets extremely easily in a short period of time. Due to this, an efficiency for replacement of stimulable phosphor sheets is improved greatly. In addition, since the stimulable phosphor sheet or the sheet member on which the stimulable phosphor sheet is adhering is attracted to the inner surface of the back base by magnetic force, there is no fear that the stimulable phosphor sheet comes off the back base in the course of reading image information from the stimulable phosphor sheet. Further, there is no fear that the stimulable phosphor sheet comes off the back base, even in the case of usage for a long time.

Structure (6)

The radiation image radiographing cassette described in either one of (1)–(5) wherein there is provided a locking mechanism capable of maintaining the lock-ON condition and the lock-OFF condition alternately.

In the radiation image radiographing cassette described in (6), it is possible to avoid the risk that the cassette moves to the lock-OFF condition in the course of radiographing, because a locking mechanism capable of maintaining the lock-ON condition is provided. Further, it is possible to conduct easily operations to separate the back base from the front cover, because the lock-OFF condition can be maintained when separating the back base from the front cover.

Structure (7)

The radiation image radiographing cassette described in (6) wherein the locking mechanism is composed of a plurality of locking claws wherein the lock-ON condition is realized under the state where the tip of the claws is protruded from the side of the back base main body, and the lock-OFF condition is realized under the state where the tip of the claws is not protruded from the side of the back base main body.

In the radiation image radiographing cassette described in (7), it is possible to provide a strong and sure locking mechanism that operates stably, because the locking mechanism is composed of a plurality of locking claws wherein the lock-ON condition is realized under the state where the tip is protruded from the side of the back base main body, and the lock-OFF condition is realized under the state where the tip is not protruded from the side of the back base main body.

Structure (8)

The radiation image radiographing cassette described in (6) wherein the locking mechanism is composed of a plurality of locking claws which act to slide on the back base while keeping the state wherein the tip is protruded from the side of the back base.

In the radiation image radiographing cassette described in (8), it is possible to provide a strong and sure locking mechanism that operates stably, because the locking mechanism is composed of a plurality of locking claws which act to slide on the back base while keeping the state wherein the tip is protruded from the side of the back base.

Structure (9)

The radiation image radiographing cassette described in (7) or (8) wherein the locking claws are arranged on at least a pair of sides facing each other of the back base.

In the radiation image radiographing cassette described in (9), it is possible to maintain, with high reliability, the condition where the front cover and the back base are united with each other, because locking claws are arranged on at least a pair of sides facing each other of the back base.

Structure (10)

The radiation image radiographing cassette described in (1) wherein when the front cover is united with the back base, a protruded portion provided on an outer peripheral portion of the back base enters a recessed portion provided on the frame of the front cover, to shield light coming from the outside.

In the radiation image radiographing cassette described in (10), external light is shielded thoroughly and there is no fear that the external light arrives at the stimulable phosphor sheet to expose it to light, because a light-shielding method by means of combination of a processed portion and a protruded portion is employed. Due to this, quality images for diagnosis can be provided.

Structure (11)

The radiation image radiographing cassette described in (1) wherein, when the front cover is united with the back base, a protruded portion provided on the frame of the front cover enters a recessed portion provided on the outer peripheral portion of the back base, to shield light coming from the outside.

In the radiation image radiographing cassette described in (11), external light is shielded thoroughly and there is no fear that the external light arrives at the stimulable phosphor sheet to expose it to light, because a light-shielding method by means of combination of a processed portion and a protruded portion is employed. Due to this, quality images for diagnosis can be provided.

Structure (12)

The radiation image radiographing cassette described in (1) wherein the inner surface of the frame of the front cover has a slope that is inclined upward from the outer peripheral portion toward the inside.

In the radiation image radiographing cassette described in (12), it is possible to design the positioning accuracy for uniting the back base and the front cover, because there is employed a structure wherein the inner surface of the frame of the front cover has a slope that is inclined from the outer peripheral portion toward the inside. Namely, it is possible to loosen the accuracy for parts on the apparatus side and to loosen the accuracy for assembling, because the slope leads automatically the back base to the position where the back base is united with the front cover, even when the position where the back base is to be united with the front cover is deviated slightly. Even when a delicate deformation is caused on the frame or the mechanism of an apparatus when the apparatus is transported, probability of occurrence of troubles can be made to be very small by uniting operations for the front cover and the back base.

Structure (13)

The radiation image radiographing cassette described in (1), (10) (11) or (12) wherein a clearance of 0.2–2.0 mm is generated between the inner surface of the frame of the front cover and the side surface of the outer wall of the back base when the front cover is united with the back base.

In the radiation image radiographing cassette described in (13), the front cover can be united with the back base surely and smoothly, because construction is made so that a clearance of 0.2–2.0 mm is generated between the inner surface of the frame of the front cover and the side surface of the outer wall of the back base when the front cover is united with the back base. Due to the presence of this clearance, manufacturing errors for the front cover and the back base can be absorbed sufficiently. Accordingly, reliability and stability for operations to unite the front cover with the back base can be improved in particular.

Structure (101)

A radiation image reading apparatus that reads radiation image information from a stimulable phosphor sheet attached to a back base of a cassette whose front cover and back base can be separated from each other, wherein there are provided an inlet through which the cassette is inserted, a separating means that separates the front cover of the cassette from the back base thereof, a vertical scanning means that vertically scans the back base separated from the front cover by the separating means, a reading means that reads radiation image information held in the stimulable phosphor sheet that is attached to the back base, an erasing means that erases the radiation image information remaining in the stimulable phosphor sheet, a re-assembling means that re-assembles the front cover with the back base again, an outlet through which the cassette subjected to combination of the front cover and the back base is ejected, and a conveyance means that moves the cassette, and a movement of the cassette between the inlet and the outlet and a movement between the outlet and the vertical scanning means are conducted including at least a rotational displacement in the constitution.

The structure (101) makes it possible to realize a small-sized apparatus while employing a non-contact conveyance method because of the constitution wherein a cassette whose front cover and back base can be separated from each other is used, the back base separated by the separating means that separates the front cover of the cassette from the back base thereof is transferred to the vertical scanning means that vertically scans, radiation image information remaining in the stimulable phosphor sheet is erased by the erasing means after the radiation image information held in the stimulable phosphor sheet attached to the back base has been read by the reading means, and the cassette is ejected to the outlet after the front cover and the back base are re-assembled by the re-assembling means, and because of the constitution wherein a movement of the cassette from the inlet to the vertical scanning means and from the vertical scanning means to the outlet is conducted including at least a rotational displacement.

It is further possible to improve stability and reliability of the apparatus with less moving points of the mechanism, compared with the occasion of the parallel displacement, because movement of the cassette between the inlet and the outlet and between the outlet and the vertical scanning means is constituted mainly by the rotational displacement. It is also possible to realize an inexpensive apparatus by reducing the number of parts of the mechanism. In addition, a user can distinguish easily between a cassette before reading and that after reading, and reliability of operations is improved, because the inlet and the outlet both for the cassette are arranged separately.

Structure (102)

The radiation image reading apparatus described in (101) wherein the rotational displacement is carried out when a part of the conveyance means or the total of the conveyance means conducts rotational displacement.

In the radiation image reading apparatus described in (102), it is not necessary to provide a plurality of conveyance means and it is possible to realize a low cost apparatus having less number of parts of the mechanism accordingly, because the rotational displacement means is carried out when a part of the conveyance means or the total of the conveyance means conducts rotational displacement. Further, the simplified mechanism makes stability and reliability of the apparatus to be improved, and it realizes a compact apparatus mechanism.

Structure (103)

The radiation image reading apparatus described in (101) or (102) wherein the rotational displacement is carried out when a part of the vertical scanning means conducts rotational displacement.

In the radiation image reading apparatus described in (103), mechanism of the conveyance means can be simplified, and a compact apparatus mechanism can be realized, because the apparatus is structured so that the rotational displacement means is carried out when a part of the vertical scanning means conducts rotational displacement.

Structure (104)

The radiation image reading apparatus described in either one of (101)–(103) wherein at least one rotation center of the rotational displacement is located beneath the cassette that is rotated.

The structure (104) makes it possible to arrange the rotation center to be close to the bottom plate because the apparatus is constituted so that at least one rotation center is located beneath the cassette that is subjected to rotational displacement.

Structure (105)

The radiation image reading apparatus described in either one of (101)–(104) wherein a fulcrum of the rotational displacement and the vertical scanning means are provided on the same base plate, and the base plate is provided on the bottom plate of the apparatus through a vibration-proof means.

In the radiation image reading apparatus described in (105), accuracy for transferring the back base to the vertical scanning means is improved because the fulcrum of the rotational displacement and the vertical scanning means are provided on the same base plate. Due to this, a highly reliable apparatus can be provided. Further, vibration in the outside of the apparatus is hardly transmitted to the vertical scanning means because the base plate is provided on the bottom plate of the apparatus through a vibration-proof means, which prevents that vibration noise is mixed in the image that is in process of being read.

Structure (106)

The radiation image reading apparatus described in either one of (101)–(105) wherein the apparatus is constituted so that the carrying in of the cassette from the inlet and an ejection of the cassette to the outlet may be conducted through at least the linear movement of the cassette.

In the radiation image reading apparatus described in (106), a cassette conveyance mechanism before rotational displacement and a cassette conveyance mechanism after rotational displacement can be constructed by a stable and simple mechanism (mechanism of linear movement), because the apparatus is constituted so that the carrying in of the cassette from the inlet and an ejection of the cassette to the outlet may be conducted through at least the linear movement of the cassette. By re-assembling this linear movement with the rotational displacement, the cassette can be moved to a desired position in the apparatus.

Structure (107)

The radiation image reading apparatus described in either one of (101)–(106) wherein an angle formed between the direction to carry in the cassette from the inlet and the vertical scanning direction of the vertical scanning means is greater than an angle formed between the ejection direction of the cassette toward the outlet and the vertical scanning direction of the vertical scanning means.

In the radiation image reading apparatus described in (107), a cassette can be inserted into the inlet without being interrupted by the cassette ejected to the outlet, because the apparatus is constituted so that an angle formed between the direction to carry in the cassette from the inlet and the vertical scanning direction is greater than an angle formed between the ejection direction of the cassette toward the outlet and the vertical scanning direction.

Structure (108)

The radiation image reading apparatus described in either one of (101)–(107) wherein the reading means and the erasing means are arranged to be located between the vertical scanning means and the outlet.

In the radiation image reading apparatus described in (108), the apparatus can be made small in size requiring only a small space, compared with an occasion where the reading means and the erasing means are arranged to be located on the opposite side about the vertical scanning means (the side opposite to the inlet and the outlet about the vertical scanning means), because the reading means and the erasing means are arranged to be located between the vertical scanning means and the outlet.

Structure (109)

The radiation image reading apparatus described in either one of (101)–(108) wherein the outlet is arranged to be located between the vertical scanning means and the inlet.

In the radiation image reading apparatus described in (109), a cassette can be inserted into the inlet without being interrupted by the cassette ejected to the outlet, because the outlet is arranged to be located between the vertical scanning means and the inlet.

Structure (110)

The radiation image reading apparatus described in either one of (101)–(109) wherein the direction to carry in the cassette from the inlet and the ejection direction of the cassette toward the outlet are inclined in the same direction from the vertical direction.

In the radiation image reading apparatus described in (110), it is easy to insert and eject the cassette, and working efficiency of a user can be improved because the apparatus is constituted so that the direction to carry in the cassette from the inlet and the ejection direction of the cassette toward the outlet may be inclined in the same direction from the vertical direction. Further, the cassette leans, when it is conveyed, on the conveyance means, eliminating the fear that the cassette may be inverted or dropped while it is conveyed, and thus, the cassette can be conveyed in a more reliable way. Due to this, reliability and stability of the apparatus are improved. Further, the mechanism of the apparatus is simplified and cost reduction is realized, because transferring to rotational displacement becomes easy.

Structure (111)

The radiation image reading apparatus described in either one of (101)–(110) wherein the cassette is inserted in the inlet with a back of a radiation image reading surface of the stimulable phosphor sheet facing the vertical scanning means, and the cassette is ejected to the outlet with a back of a radiation image reading surface of the stimulable phosphor sheet facing the vertical scanning means.

In the radiation image reading apparatus described in (111), the back base of the cassette can be transferred easily to the vertical scanning mechanism by the rotational displacement, because the apparatus is constituted so that the cassette is inserted in the inlet with a back of a radiation image reading surface of the stimulable phosphor sheet facing the vertical scanning means, and the cassette is ejected to the outlet with a back of a radiation image reading surface of the stimulable phosphor sheet facing the vertical scanning means.

Structure (112)

The radiation image reading apparatus described in either one of (101)–(111) wherein radiation image information is read from the stimulable phosphor sheet by the reading means in the going travel of the vertical scanning means, and radiation image information remaining in the stimulable phosphor sheet is erased by the erasing means in the returning travel of the vertical scanning means.

In the radiation image reading apparatus described in (112), it is possible to utilize the travel time to and from for vertical scanning effectively without wasting, and to improve processing capacity of the apparatus, because the apparatus is constituted so that radiation image information is read from the stimulable phosphor sheet in the going travel of the vertical scanning means, and radiation image information remaining in the stimulable phosphor sheet is erased in the returning travel of the vertical scanning means.

Structure (113)

The radiation image reading apparatus described in either one of (101)–(112) wherein a height of the inlet is different from that of the outlet.

In the radiation image reading apparatus described in (113), an operation to take out the cassette ejected to the outlet and an operation to insert the cassette in the inlet can be conducted smoothly without interfering with each other, because a height of the inlet and that of the outlet are constituted to be different each other. Due to this, working efficiency of a user can be improved.

Structure (114)

The radiation image reading apparatus described in either one of (101)–(113) wherein the back base is attracted to the vertical scanning means by magnetic force, and thereby, the back base is transferred from the conveyance means to the vertical scanning means.

In the radiation image reading apparatus described in (114), the back base can be transferred from the conveyance means to the vertical scanning means surely because the apparatus is constituted so that the back base may be attracted to the vertical scanning means by magnetic force. Since the transferring by means of magnetic force can be realized at low cost, the apparatus can be made at low cost.

Structure (115)

The radiation image reading apparatus described in either one of (101)–(114) wherein at least a part of the surface of the back base is composed of a ferromagnetic body, and at least a part of the surface of the vertical scanning means that attracts the back base is composed of a magnet.

In the radiation image reading apparatus described in (115), weight on the back base side (weight of the cassette) is not increased by weight of the magnet, and transferring of the back base by means of magnetic force can be realized, because at least a part of the surface of the back base is composed of a ferromagnetic body, and at least a part of the surface of the vertical scanning means that attracts the back base is composed of a magnet.

Structure (116)

The radiation image reading apparatus described in either one of (101)–(113) wherein the back base is transferred to the vertical scanning means from the conveyance means when the back base is attracted to the vertical scanning means through suction such as vacuum.

In the radiation image reading apparatus described in (116), operations for tearing the back base off the vertical scanning means can be conducted simply and surely by turning off suction such as vacuum, because the back base is arranged to be attracted to the vertical scanning means by suction such as vacuum.

Structure (117)

The radiation image reading apparatus described in either one of (101)–(116) wherein the apparatus has a means on which a plurality of cassettes ejected from the outlet can be stacked.

In the radiation image reading apparatus described in (117), it is possible to take out processed cassettes from the outlet collectively, because the apparatus is constituted so that a plurality of cassettes ejected from the outlet may be stacked. Due to this, working efficiency of a user can be improved.

Structure (118)

A radiation image reading apparatus that reads radiation image information from a stimulable phosphor sheet attached to a back base of a cassette whose front cover and back base can be separated from each other, wherein there are provided an inlet/outlet section through which the cassette is inserted or ejected, a separating means that separates the front cover of the cassette from the back base thereof, a vertical scanning means that vertically scans the back base separated from the front cover by the separating means, a reading means that reads radiation image information held in the stimulable phosphor sheet that is attached to the back base, an erasing means that erases the radiation image information remaining in the stimulable phosphor sheet, a re-assembling means that re-assembles the front cover with the back base again, and a conveyance means that moves the cassette, and a movement of the cassette between the inlet/outlet section and the vertical scanning means is conducted including at least a rotational displacement.

The structure (118) makes it possible to realize a small-sized apparatus while employing a non-contact conveyance method because of the constitution wherein a cassette whose front cover and back base can be separated from each other is used, the back base separated by the separating means that separates the front cover of the cassette from the back base thereof is transferred to the vertical scanning means that vertically scans, radiation image information remaining in the stimulable phosphor sheet is erased by the erasing means, after the radiation image information held in the stimulable phosphor sheet attached to the back base has been read by the reading means, and the cassette is ejected to the inlet/outlet after the front cover and the back base are re-assembled by the re-assembling means, and because of the constitution wherein a movement of the cassette between the inlet/outlet and the vertical scanning means is conducted including at least a rotational displacement. It is further possible to improve stability and reliability of the apparatus with less moving points of the mechanism, compared with the occasion of the parallel displacement, because movement of the cassette between the inlet/outlet section and the vertical scanning means is constituted mainly by the rotational displacement. It is also possible to realize an inexpensive apparatus by reducing the number of parts of the mechanism. In addition, it is possible to insert simultaneously the cassettes in quantity equivalent to the number of openings (inlet/outlets) because an inlet and an outlet for the cassette are re-assembled to be one (to be an inlet/outlet). For example, if the number of openings is two, two cassettes can be inserted into the openings simultaneously. It is also possible to make the apparatus to be small by making the number of opening to be one.

Structure (119)

The radiation image reading apparatus described in (118) wherein a rotational displacement means that makes the cassette to be subjected to rotational displacement between the inlet/outlet and the vertical scanning means is performed when a part or the whole of the conveyance means rotates.

In the radiation image reading apparatus described in (119), it is not necessary to provide a plurality of conveyance means and it is possible to realize a low cost apparatus having less number of parts of the mechanism accordingly, because the rotational displacement is carried out when a part of the conveyance means or the total of the conveyance means conducts rotational displacement. Further, the simplified mechanism makes stability and reliability of the apparatus to be improved, and it realizes a compact apparatus mechanism.

Structure (120)

The radiation image reading apparatus described in (118) wherein a rotational displacement means that makes the cassette to be subjected to rotational displacement between the inlet/outlet and the vertical scanning means is performed when a part of the vertical scanning means rotates.

In the radiation image reading apparatus described in (120), it is possible to simplify the mechanism of the conveyance means and to realize a compact apparatus mechanism, because the rotational displacement means is structured so that the rotational displacement is performed when a part of the vertical scanning means rotates.

Structure (121)

The radiation image reading apparatus described in (118) or (119) wherein at least one rotation center of the rotational displacement is located beneath the cassette that is rotated.

In the radiation image reading apparatus described in (121), it is possible to provide the rotation center in the vicinity of the bottom plate, because at least one rotation center of the rotational displacement is located beneath the cassette that is rotated. Due to this, the rotational displacement that is more reliable and more stable can be conducted, because shifting of the rotation center is reduced.

Structure (122)

The radiation image reading apparatus described in (118), (119) or (121) wherein a fulcrum of the rotational displacement and the vertical scanning means are provided on the same base plate, and the base plate is provided on the bottom plate of the apparatus through a vibration-proof means.

In the radiation image reading apparatus described in (122), accuracy for transferring the back base to the vertical scanning means is improved because the fulcrum of the rotational displacement and the vertical scanning means are provided on the same base plate. Due to this, a highly reliable apparatus can be provided. Further, vibration in the outside of the apparatus is hardly transmitted to the vertical scanning means because the base plate is provided on the bottom plate of the apparatus through a vibration-proof means, which prevents that vibration noise is mixed in the image that is in process of being read.

Structure (123)

The radiation image reading apparatus described in either one of (118)–(122) wherein the apparatus is constituted so that the carrying in of the cassette from the inlet and an ejection of the cassette to the outlet may be conducted through at least the linear movement of the cassette.

In the radiation image reading apparatus described in (123), a cassette conveyance mechanism before rotational displacement and a cassette conveyance mechanism after rotational displacement can be constructed by a stable and simple mechanism (mechanism of linear movement), because the apparatus is constituted so that the carrying in of the cassette from the inlet and an ejection of the cassette to the inlet/outlet may be conducted through at least the linear movement of the cassette. By re-assembling this linear movement with the rotational displacement, the cassette can be moved to a desired position in the apparatus.

Structure (124)

The radiation image reading apparatus described in either one of (118)–(122) wherein the reading means and the erasing means are arranged to be located between the vertical scanning means and the outlet.

In the radiation image reading apparatus described in (124), the apparatus can be made small in size requiring only a small space, compared with an occasion where the reading means and the erasing means are arranged to be located on the opposite side about the vertical scanning means (the side opposite to the inlet/outlet about the vertical scanning means), because the reading means and the erasing means are arranged to be located between the vertical scanning means and the outlet.

Structure (125)

The radiation image reading apparatus described in either one of (118)–(124) wherein the direction to carry in the cassette from the inlet and the ejection direction of the cassette toward the outlet are inclined by a prescribed angle from the vertical direction.

In the radiation image reading apparatus described in (125), it is easy to insert and eject the cassette, and working efficiency of a user can be improved because the apparatus is constituted so that the direction to carry in the cassette from the inlet/outlet and the ejection direction of the cassette toward the inlet/outlet may be inclined by a prescribed angle from the vertical direction. Further, the cassette leans, when it is conveyed, on the conveyance means, eliminating the fear that the cassette may be inverted or dropped while it is conveyed, and thus, the cassette can be conveyed in a more reliable way. Due to this, reliability and stability of the apparatus are improved. Further, the mechanism of the apparatus is simplified and cost reduction is realized, because transferring to rotational displacement becomes easy.

Structure (126)

The radiation image reading apparatus described in either one of (118)–(125) wherein the cassette is inserted in the inlet with a back of a radiation image reading surface of the stimulable phosphor sheet facing the vertical scanning means, and the cassette is ejected to the outlet with a back of a radiation image reading surface of the stimulable phosphor sheet facing the vertical scanning means.

In the radiation image reading apparatus described in (126), the back base of the cassette can be transferred easily to the vertical scanning mechanism by the rotational displacement, because the apparatus is constituted so that the cassette is inserted in the inlet with a back of a radiation image reading surface of the stimulable phosphor sheet facing the vertical scanning means, and the cassette is ejected to the aforesaid outlet with a back of a radiation image reading surface of the stimulable phosphor sheet facing the vertical scanning means.

Structure (127)

The radiation image reading apparatus described in either one of (118)–(126) wherein radiation image information is read from the stimulable phosphor sheet by the reading means in the going travel of the vertical scanning means, and radiation image information remaining in the stimulable phosphor sheet is erased by the erasing means in the returning travel of the vertical scanning means.

In the radiation image reading apparatus described in (127), it is possible to utilize the travel time to and from for vertical scanning effectively without wasting, and to improve processing capacity of the apparatus, because the apparatus is constituted so that radiation image information is read from the stimulable phosphor sheet in the going travel of the vertical scanning means, and radiation image information remaining in the stimulable phosphor sheet is erased in the returning travel of the vertical scanning means.

Structure (128)

The radiation image reading apparatus described in either one of (118)–(127) wherein the back base is attracted to the vertical scanning means by magnetic force, and thereby, the back base is transferred from the conveyance means to the vertical scanning means.

In the radiation image reading apparatus described in (128), the back base can be transferred from the conveyance means to the vertical scanning means surely because the apparatus is constituted so that the back base may be attracted to the vertical scanning means by magnetic force. Since the transferring by means of magnetic force can be realized at low cost, the apparatus can be made at low cost.

Structure (129)

The radiation image reading apparatus described in either one of (118)–(128) wherein at least a part of the surface of the back base is composed of a ferromagnetic body, and at least a part of the surface of the vertical scanning means that attracts the back base is composed of a magnet.

In the radiation image reading apparatus described in (129), weight on the back base side (weight of the cassette) is not increased by weight of the magnet, and transferring of the back base by means of magnetic force can be realized, because at least a part of the surface of the back base is composed of a ferromagnetic body, and at least a part of the surface of the vertical scanning means that attracts the back base is composed of a magnet.

Structure (130)

The radiation image reading apparatus described in either one of (118)–(127) wherein the back base is transferred to the vertical scanning means from the conveyance means when the back base is attracted to the vertical scanning means through suction such as vacuum.

In the radiation image reading apparatus described in (130), operations for tearing the back base off the vertical scanning means can be conducted simply and surely by turning off suction such as vacuum, because the back base is arranged to be attracted to the vertical scanning means by suction such as vacuum.

Structure (131)

The radiation image reading apparatus described in either one of (118)–(130) wherein the number of the inlet/outlet is one.

In the radiation image reading apparatus described in (131), a size of an apparatus can be made small because the number of the inlet/outlet is made to be one. In particular, it is possible to provide a size of an apparatus which can be installed even in the small hospital having no room for installation space such as a medical practitioner.

Structure (132)

The radiation image reading apparatus described in either one of (118)–(130) wherein the number of the inlet/outlet is two.

In the radiation image reading apparatus described in (132), a size of an apparatus can be made small and working efficiency can be maintained, because the number of the inlet/outlet is made to be two. Namely, it is possible to deal with most radiographing operations by providing two inlet/outlets, because an average number of times for radiographing for one inspection is 1.8. Due to this, the apparatus can be used without lowering working efficiency in facilities in various sizes covering from a practitioner to a large hospital.

Structure (133)

A radiation image reading apparatus that reads radiation image information from a stimulable phosphor plate housed in a cassette, wherein there are provided a loading inlet into which the cassette is inserted, a vertical scanning means that vertically scans the stimulable phosphor plate after it is drawn out of the cassette loaded in the loading inlet, a reading means that reads radiation image information held in the stimulable phosphor plate, an erasing means that erases the radiation image information remaining in the stimulable phosphor plate, and a conveyance means that moves the stimulable phosphor plate, and a movement of the stimulable phosphor plate between the loading inlet and the vertical scanning means is conducted including at least a rotational displacement.

In the radiation image reading apparatus described in (133), it is possible to make the apparatus to be small while employing a non-contact conveyance method, because a stimulable phosphor plate is transferred to the vertical scanning means that vertically scans the stimulable phosphor plate after the stimulable phosphor plate housed in the cassette is drawn out, then, radiation image information remaining in the stimulable phosphor plate is erased after radiation image information held in the stimulable phosphor plate is read by the reading means, and a movement of the stimulable phosphor plate between the loading inlet and the vertical scanning means is made to be conducted including at least a rotational displacement. Further, since a movement of the stimulable phosphor plate between the loading inlet and the vertical scanning means is constituted to mainly contain rotational displacement, moving points of the mechanism can be reduced and stability and reliability of the apparatus can be improved, compared with an occasion of the parallel displacement.

Structure (134)

The radiation image reading apparatus described in (133) wherein the rotational displacement means that conducts rotational displacement of the stimulable phosphor plate between the loading inlet and the vertical scanning means is performed when a part or the whole of the conveyance means rotates.

In the radiation image reading apparatus described in (134), it is not necessary to provide a plurality of conveyance means separately, and thereby a low cost apparatus having less number of parts of mechanism can be achieved, because the rotational displacement means is structured to be performed when a part or the whole of the conveyance means rotates.

Structure (135)

The radiation image reading apparatus described in (133) wherein the rotational displacement means that conducts rotational displacement of the cassette between the loading inlet and the vertical scanning means is structured to be performed when a part of the vertical scanning means is rotated.

In the radiation image reading apparatus described in (135), it is possible to simplify the mechanism of the conveyance means and to create a compact apparatus mechanism, because the rotational displacement means is structured to be performed when a part of the vertical scanning means is rotated.

Structure (136)

The radiation image reading apparatus described in (133) or (135) wherein at least one rotation center of the rotational displacement is located under the stimulable phosphor plate.

In the radiation image reading apparatus described in (136), it is possible to arrange the rotation center to be located in the vicinity of the bottom plate because at least one rotation center of the rotational displacement is located under the stimulable phosphor plate.

Structure (137)

The radiation image reading apparatus described in (133), (134) or (136) wherein a fulcrum of the rotational displacement and the vertical scanning means are provided on the same base plate, and the base plate is provided on the bottom plate of the apparatus through a vibration-proof means.

In the radiation image reading apparatus described in (137), accuracy for transferring the stimulable phosphor plate to the vertical scanning means is improved, because the fulcrum of the rotational displacement and the vertical scanning means are provided on the same base plate. Due to this, a highly reliable apparatus can be provided. Further, vibration in the outside of the apparatus is hardly transmitted to the vertical scanning means because the base plate is provided on the bottom plate of the apparatus through a vibration-proof means, which prevents that vibration noise is mixed in the image that is in process of being read.

Structure (138)

The radiation image reading apparatus described in either one of (133)–(137) wherein drawing out of the cassette from the stimulable phosphor plate and loading of the stimulable phosphor plate in the cassette are conducted including the linear movement of at least the stimulable phosphor plate.

In the radiation image reading apparatus described in (138), a conveyance mechanism for the stimulable phosphor plate before the rotational displacement and a conveyance mechanism for the stimulable phosphor plate after the rotational displacement can be constructed by a stable and simple mechanism (mechanism of linear movement), because drawing out of the stimulable phosphor plate from the cassette and loading of the stimulable phosphor plate in the cassette are conducted including at least linear movement of the stimulable phosphor plate. By re-assembling this linear movement with the rotational displacement, the stimulable phosphor plate can be moved to a desired position in the apparatus.

Structure (139)

The radiation image reading apparatus described in either one of (133)–(138) wherein the reading means and the erasing means are arranged to be located between the vertical scanning means and the loading inlet.

In the radiation image reading apparatus described in (139), less space is required and an apparatus can be made small, compared with an occasion wherein the reading means and the erasing means are arranged on the opposite side of the vertical scanning means (on the side opposite to that for the loading inlet about the vertical scanning means), because the reading means and the erasing means are arranged to be located between the vertical scanning means and the loading inlet.

Structure (140)

The radiation image reading apparatus described in either one of (133)–(139) wherein the direction of loading for the cassette in the loading inlet is inclined from the vertical direction by a prescribed amount of angle.

In the radiation image reading apparatus described in (140), operations for loading the cassette in the loading inlet and operations for taking out the cassette from the loading inlet are easy and working efficiency of a user can be improved, because the direction of loading for the cassette in the loading inlet is inclined from the vertical direction by a prescribed amount of angle.

Structure (141)

The radiation image reading apparatus described in either one of (133)–(140), wherein the cassette is loaded in the loading inlet with a back of a radiation image reading surface of the stimulable phosphor plate facing the vertical scanning means.

In the radiation image reading apparatus described in (141), the stimulable phosphor plate can be transferred easily to the vertical scanning mechanism by the rotatio displacement, because the apparatus is constituted so that the cassette is loaded in the loading inlet in the direction where a back of the radiation image reading surface of the stimulable phosphor plate faces the vertical scanning means, and the cassette is ejected to the aforesaid outlet with a back of a radiation image reading surface of the stimulable phosphor sheet facing the vertical scanning means.

Structure (142)

The radiation image reading apparatus described in either one of (133)–(141), wherein radiation image information is read from the stimulable phosphor plate by the reading means in the going travel of the vertical scanning means, and radiation image information remaining in the stimulable phosphor plate is erased by the erasing means in the returning travel of the vertical scanning means.

In the radiation image reading apparatus described in (142), it is possible to utilize the travel time to and from for vertical scanning effectively without wasting, and to improve processing capacity of the apparatus, because the apparatus is constituted so that radiation image information is read from the stimulable phosphor plate in the going travel of the vertical scanning means, and radiation image information remaining in the stimulable phosphor plate is erased in the returning travel of the vertical scanning means.

Structure (143)

The radiation image reading apparatus described in either one of (133)–(142) wherein the back side of the stimulable phosphor plate is attracted to the vertical scanning means by magnetic force, and thereby, the stimulable phosphor plate is transferred from the conveyance means to the vertical scanning means.

In the radiation image reading apparatus described in (143), the stimulable phosphor plate can be transferred from the conveyance means to the vertical scanning means surely because the apparatus is constituted so that the back side of the stimulable phosphor plate may be attracted to the vertical scanning means by magnetic force. Since the transferring by means of magnetic force can be realized at low cost, the apparatus can be made at low cost.

Structure (144)

The radiation image reading apparatus described in either one of (133)–(143) wherein at least a part of the back side of the stimulable phosphor plate is composed of a ferromagnetic body, and at least a part of the surface of the vertical scanning means that attracts the stimulable phosphor plate is composed of a magnet.

In the radiation image reading apparatus described in (144), weight of the stimulable phosphor plate back base is not increased by weight of the magnet, and weight of the cassette is not increased accordingly, and transferring of the stimulable phosphor plate by means of magnetic force can be realized.

Structure (145)

The radiation image reading apparatus described in (144) wherein the magnet is a permanent magnet.

In the radiation image reading apparatus described in (145), the apparatus can be made at low cost, because an inexpensive permanent magnet is used as a magnet. Since the stimulable phosphor plate is torn off the magnet through rotational displacement, the tearing force can be small compared with an occasion to tear off through parallel displacement, even when the permanent magnet is used as a magnet.

Structure (146)

The radiation image reading apparatus described in either one of (133)–(142) wherein the stimulable phosphor plate is transferred to the vertical scanning means from the conveyance means when the back side of the stimulable phosphor plate is attracted to the vertical scanning means through suction such as vacuum.

In the radiation image reading apparatus described in (146), operations for tearing the stimulable phosphor plate off the vertical scanning means by turning off suction such as vacuum can be conducted simply and surely, because the back side of the stimulable phosphor plate is arranged to be attracted to the vertical scanning means by suction such as vacuum.

Structure (147)

The radiation image reading apparatus described in either one of (133)–(146) wherein the number of the loading inlet is one.

In the radiation image reading apparatus described in (147), a size of an apparatus can be made small because the number of the loading inlet is made to be one. In particular, it is possible to provide a size of an apparatus which can be installed even in the small hospital having no room for installation space such as a medical practitioner.

Structure (148)

The radiation image reading apparatus described in either one of (133)–(146) wherein the number of the loading inlet is two.

In the radiation image reading apparatus described in (148), a size of an apparatus can be made small and working efficiency can be maintained, because the number of the loading inlet is made to be two. Namely, it is possible to deal with most radiographing operations by providing two loading inlets, because an average number of times for radiographing for one inspection is 1.8. Due to this, the apparatus can be used without lowering working efficiency in facilities in various sizes covering from a medical practitioner to a large hospital.

Structure (201)

A radiation image reading apparatus that reads radiation image information from a stimulable phosphor sheet housed in a cassette, wherein there are provided an insertion inlet into which the cassette is inserted, an ejection outlet from which the cassette is ejected and a stacker section on which a plurality of cassettes ejected from the ejection outlet can be stacked, and the cassette inserted in the insertion inlet is conveyed to the inside of the apparatus main body, then, radiation image information is subjected to reading/erasing from the stimulable phosphor sheet housed in the cassette, and the cassette is ejected to the ejection outlet under the condition that the cassette houses the stimulable phosphor sheet which has been subjected to reading/erasing, then, the cassette ejected to the ejection outlet is stacked successively on the stacker section.

In the radiation image reading apparatus described in (201), it is possible to insert a cassette successively into the radiation image reading apparatus until the stacker is filled, without removing the processed cassette, because the apparatus is structured so that a cassette inserted through the insertion inlet is processed in succession (reading/erasing), then the cassette thus processed is ejected from the ejection outlet, and a plurality of cassettes ejected from the ejection outlet are stacked on the stacker section.

Structure (202)

The radiation image reading apparatus described in (201) wherein when the first cassette inserted into the insertion inlet is conveyed to the inside of the apparatus main body, the insertion inlet becomes ready to accept the second cassette, then, under this condition, when the second cassette is inserted into the insertion inlet, the second cassette is stopped to be on standby at the insertion inlet, then, when the first cassette is ejected to the ejection outlet or before the first cassette is ejected, the second cassette which has been on standby at the insertion inlet is conveyed to the inside of the apparatus main body.

In the radiation image reading apparatus described in (202), it is possible to make two cassettes to be accepted almost simultaneously to the radiation image reading apparatus (the second cassette can be inserted if it waits for a period of time for the first cassette to be conveyed to the inside of the apparatus, and this waiting time is very short), because when the first cassette inserted into the insertion inlet is conveyed to the inside of the apparatus main body, the insertion inlet becomes ready to accept the second cassette, then, under this condition, when the second cassette is inserted into the insertion inlet, the second cassette is stopped to be on standby at the insertion inlet, then, when the first cassette is ejected to the ejection outlet, the second cassette which has been on standby at the insertion inlet is conveyed to the inside of the apparatus main body.

Structure (203)

The radiation image reading apparatus described in (201) wherein the conveyance direction for conveying the cassette from the insertion inlet to the inside of the apparatus main body is a direction to convey the cassette downward from the insertion inlet to the lower part of the apparatus main body, and the conveyance direction for ejecting the cassette to the ejection outlet is a direction to convey the cassette upward from the lower part of the apparatus main body to the ejection outlet.

In the radiation image reading apparatus described in (203), the conveyance direction for conveying the cassette from the insertion inlet to the inside of the apparatus main body is a direction to convey the cassette downward from the insertion inlet to the lower part of the apparatus main body, and the conveyance direction for ejecting the cassette to the ejection outlet is a direction to convey the cassette upward from the lower part of the apparatus main body to the ejection outlet. Since the cassette is conveyed upward and downward as stated above, it is possible to make a floor space for the apparatus to be small.

Structure (204)

The radiation image reading apparatus described in (201) wherein the direction for ejecting the cassette to the ejection outlet and the direction for holding the cassettes stacked on the stacking section and the direction for inserting the cassette into the insertion inlet are inclined to the same direction against the plane perpendicular to the floor surface.

In the radiation image reading apparatus described in (204), it is possible to handle in the same direction when inserting the cassette or taking out the cassette, and to attain easy operations accordingly, because the direction for ejecting the cassette to the ejection outlet or the direction for holding the cassettes stacked on the stacking section and the direction for inserting the cassette into the insertion inlet are inclined to the same direction against the plane perpendicular to the floor surface. Further, more natural traffic line can be realized compared with handling in the vertical or horizontal direction, because it is possible to handle the cassette by tilting it, thus, more easy operations can be realized.

Structure (205)

The radiation image reading apparatus described in (201) wherein there is provided a notifying means which notifies that the stacker section is filled with cassettes, when the stacker is filled with the cassettes ejected from the ejection outlet.

In the radiation image reading apparatus described in (205), a user can learn easily the timing when the stacker is filled because there is provided a notifying means which notifies that the stacker section is filled with cassettes, when the stacker is filled with the cassettes ejected from the ejection outlet, and thereby the user can work without paying attention to the state of the stacker section, thus, working efficiency can be improved.

Structure (206)

The radiation image reading apparatus described in (201) wherein control is made so that the cassette cannot be inserted into the insertion inlet, or control is made so that the cassette is held to be on standby at the insertion inlet even when the cassette is inserted, or control is made so that conveyance of the cassette in the apparatus is stopped so that the cassette may not be ejected to the ejection outlet, when the stacker section is filled with the cassettes ejected from the ejection outlet.

In the radiation image reading apparatus described in (206), it is possible to prevent the risk that the processed cassette is ejected on the stacker that is already filled with cassettes and cassette jam is caused and to avoid the accident that the cassette is pushed out of the stacker section and is dropped, because control is made so that the cassette cannot be inserted into the insertion inlet, or control is made so that the cassette is held to be on standby at the insertion inlet even when the cassette is inserted, or control is made so that conveyance of the cassette in the apparatus is topped so that the cassette may not be ejected to the ejection outlet, when the stacker section is filled with the cassettes ejected from the ejection outlet.

Structure (207)

The radiation image reading apparatus described in (201) wherein the stacker section is positioned to be lower than the ejection outlet so that the cassette ejected out of the ejection outlet may be led by gravity to the stacker section to be housed therein.

In the radiation image reading apparatus described in (207), it is possible to realize that the ejected cassette may be led to the stacker section to be housed therein at low cost, because the stacker section is positioned to be lower than the ejection outlet so that the cassette ejected out of the ejection outlet may be led by gravity to the stacker section to be housed therein.

Structure (208)

The radiation image reading apparatus described in (201) wherein there is provided a conveyance mechanism that conveys the cassette ejected out of the ejection outlet to the stacker section.

In the radiation image reading apparatus described in (208), it is possible to convey the ejected cassette to the stacker section surely and there is no concern that the ejected cassette is jammed while it is moved to the stacker section, because there is provided a conveyance mechanism that conveys the cassette ejected out of the ejection outlet to the stacker section.

Structure (209)

The radiation image reading apparatus described in (201) wherein an opening section of the insertion inlet and an opening section of the ejection outlet are arranged so that they are respectively horizontal and are in parallel with the floor surface.

In the radiation image reading apparatus described in (209), it is possible to make a width or a depth of the apparatus to be smallest and thereby to make the floor space for the apparatus to be small, because an opening section of the insertion inlet and an opening section of the ejection outlet are arranged so that they are respectively horizontal and are in parallel with the floor surface.

Structure (210)

The radiation image reading apparatus described in (201) wherein the insertion inlet is positioned in front of the ejection outlet or the stacker section (closer to a user), and to be lower than the ejection outlet or the stacker section.

In the radiation image reading apparatus described in (210), the insertion inlet having higher access frequency is positioned to precede the ejection outlet or the stacker section (closer to a user), and to be lower than the ejection outlet or the stacker section. Namely, the insertion inlet having higher access is positioned at the front side of the apparatus so that it may be used easily by a user, and it is arranged to be lower than the ejection outlet or the stacker section so that a cassette may be easily inserted, thus, an apparatus that can be used easily by a user is realized, and working efficiency is improved.

Structure (211)

The radiation image reading apparatus described in (201) wherein the mechanism for conveying the cassette is structured so that it rotates between the insertion inlet and the ejection outlet.

In the radiation image reading apparatus described in (211), stability of the apparatus can be improved, compared with the mechanism of parallel displacement, because the mechanism for conveying the cassette is structured so that it rotates between the insertion inlet and the ejection outlet. Further, the apparatus cost may also be made low.

Structure (212)

The radiation image reading apparatus described in (201) wherein the cassette has a structure in which a front cover can be separated from a back base, and the radiation image information is read from the stimulable phosphor sheet under the condition that the stimulable phosphor sheet is attached on the back base.

In the radiation image reading apparatus described in (212), the stimulable phosphor is hardly scratched and image information having high quality can be provided for a long time compared with a type wherein a stimulable phosphor sheet is taken out and inserted in a cassette, because the cassette has a structure in which a front cover can be separated from a back base, and the radiation image information is read from the stimulable phosphor sheet under the condition that the stimulable phosphor sheet is attached on the back base.

Structure (213)

A radiation image reading apparatus that reads radiation image information from a stimulable phosphor sheet housed in a cassette, wherein there is provided an insertion/ejection opening through which the cassette is inserted or ejected, and the cassette inserted in the insertion/ejection opening is conveyed to the inside of the apparatus main body, then, radiation image information from the stimulable phosphor sheet housed in the cassette is subjected to reading/erasing, and the cassette is ejected to the insertion/ejection opening under the condition that the stimulable phosphor sheet which has been subjected to reading/erasing is housed in the cassette.

In the radiation image reading apparatus described in (213), at least one insertion/ejection opening is provided and a cassette inserted in either one of them is conveyed to the inside of the apparatus main body, and after the radiation image information from the stimulable phosphor sheet housed in the cassette is subjected reading/erasing, the cassette is ejected to the insertion/ejection opening under the condition that the stimulable phosphor sheet which has been subjected to reading/erasing is housed in the cassette. Therefore, cassettes in quantity equivalent to the number of the insertion/ejection openings can be inserted simultaneously, and working efficiency can be improved accordingly. In addition, since the apparatus is structured so that a stimulable phosphor sheet is read after a cassette is taken in the apparatus, a degree of freedom for handling the stimulable phosphor sheet is improved, and reliability and stability are increased.

Structure (214)

The radiation image reading apparatus described in (213) wherein there is provided a means that acts so that the cassette subjected to reading/erasing may be ejected to the insertion/ejection opening where the cassette was inserted, and further provided a means which prohibits the insertion of the following cassette into the insertion/ejection opening or a means which notifies that the following cassette cannot be inserted, when the cassette inserted in the insertion/ejection opening is conveyed into the apparatus main body.

In the radiation image reading apparatus described in (214), it is possible to prevent an accident that two cassettes are inserted in the same insertion/ejection opening, because there is provided a means that acts so that the cassette subjected to reading/erasing may be ejected to the insertion/ejection opening where the cassette was inserted and prohibits the insertion of the following cassette in the insertion/ejection opening, when the cassette subjected to reading/erasing is ejected to the insertion/ejection opening, or a means that notifies that the following cassette cannot be inserted. Further, a user can advance its work without being confused, because the processed cassette is ejected to the insertion/ejection opening in which the cassette is inserted.

Structure (215)

The radiation image reading apparatus described in (213) wherein priority ranking is given to a plurality of insertion/ejection openings, and when a cassette is not inserted in the insertion/ejection opening having the higher priority ranking, the cassette is ejected in the insertion/ejection opening having the higher priority ranking.

In the radiation image reading apparatus described in (215), it is possible for a user to keep the insertion/ejection opening that can be handled easily to be open on a priority basis and to improve wording efficiency, because priority ranking is given to a plurality of insertion/ejection openings, and when a cassette is not inserted in the insertion/ejection opening having the higher priority ranking, the cassette is inserted in the insertion/ejection opening having the higher priority ranking.

Structure (216)

The radiation image reading apparatus described in (213) wherein each of a plurality of insertion/ejection openings has a different height from the floor surface, and the insertion/ejection opening located at the position that is closer to the standing position of a user is given a lower position.

In the radiation image reading apparatus described in (216), an apparatus that is easy for a user to handle is realized, and wording efficiency is improved, because each of a plurality of insertion/ejection openings has a different height from the floor surface, and the insertion/ejection opening located at the position that is closer to the standing position of a user is given a lower position.

Structure (217)

The radiation image reading apparatus described in (213) wherein the cassette has a structure in which a front cover can be separated from a back base, and the radiation image information is read from the stimulable phosphor sheet under the condition that the stimulable phosphor sheet is attached on the back base.

In the radiation image reading apparatus described in (217), the stimulable phosphor is hardly scratched and image information having high quality can be provided for a long time compared with a type wherein a stimulable phosphor sheet is taken out and inserted in a cassette, because the cassette has a structure in which a front cover can be separated from a back base, and the radiation image information is read from the stimulable phosphor sheet under the condition that the stimulable phosphor sheet is attached on the back base.

Structure (301)

A radiation image reading apparatus for reading radiation image information from a stimulable phosphor sheet having therein a conveyance means that conveys the stimulable phosphor sheet, or a cassette holding the stimulable phosphor sheet, or a part of the cassette holding the stimulable phosphor sheet, a reading means that reads radiation image information from the stimulable phosphor sheet, an erasing means that erases radiation image information from the stimulable phosphor sheet, an opening/closing means that opens and closes a part of an enclosure of the radiation image reading apparatus, an opening/closing detection means that detects the state of opening/closing of the opening/closing means, and a stopping means that stops operations of the conveyance means forcibly when the opening/closing detection means detects the state of opening, wherein when a jam is caused on the stimulable phosphor sheet that is being conveyed by the conveyance means, or on a cassette holding the stimulable phosphor sheet, or on a part of the cassette holding the stimulable phosphor sheet, operations of the conveyance means are stopped forcibly by making the opening/closing means to be in the state of opening, and the stimulable phosphor sheet, or the cassette holding the stimulable phosphor sheet, or a part of the cassette holding the stimulable phosphor sheet each being jammed is removed through the opening generated when the opening/closing means is made to be in the state of opening.

In the radiation image reading apparatus described in (301), it is possible to clear the jam safely without hurting the surface of the stimulable phosphor sheet without waiting for the arrival of a service engineer even when a jam is caused in the course of usage, because there are provided a conveyance means that conveys the stimulable phosphor sheet, or a cassette holding the stimulable phosphor sheet, or a part of the cassette holding the stimulable phosphor sheet, a reading means that reads radiation image information from the stimulable phosphor sheet, an erasing means that erases radiation image information from the stimulable phosphor sheet, an opening/closing means that opens and closes a part of an enclosure of the radiation image reading apparatus, an opening/closing detection means that detects the state of opening/closing of the opening/closing means, and a stopping means that stops operations of the conveyance means forcibly when the opening/closing detection means detects the state of opening, and when a jam is caused on the stimulable phosphor sheet that is being conveyed by the conveyance means, or on a cassette holding the stimulable phosphor sheet, or on a part of the cassette holding the stimulable phosphor sheet, operations of the conveyance means are stopped forcibly by making the opening/closing means to be in the state of opening, and the stimulable phosphor sheet, or the cassette holding the stimulable phosphor sheet, or a part of the cassette holding the stimulable phosphor sheet each being jammed is removed through the opening generated when the opening/closing means is made to be in the state of opening.

Structure (302)

The radiation image reading apparatus described in (301) having therein a position detecting means that detects a position of the conveyance means and/or detects a position of the stimulable phosphor sheet in the conveyance means, or of the cassette holding the stimulable phosphor sheet, or of a part of the cassette holding the stimulable phosphor sheet, a jam detection means that detects, based on output signals from the position detecting means, a jam of the stimulable phosphor sheet, or of the cassette holding the stimulable phosphor sheet, or of a part of the cassette holding the stimulable phosphor sheet, and a notifying means that notifies information detected by the jam detection means to a user, wherein when the jam detection means detects a jam, operations of the conveyance means are stopped, and information detected by the jam detection means is notified to the user through the notifying means.

In the radiation image reading apparatus described in (302), a user can detect occurrence of a jam on a real time basis, and can advance to jam clearing safely, because there are provided a position detecting means that detects a position of the conveyance means and/or detects a position of the stimulable phosphor sheet in the conveyance means, or of the cassette holding the stimulable phosphor sheet, or of a part of the cassette holding the stimulable phosphor sheet, and a jam detection means that detects, based on output sequence from the position detecting means, a jam of the stimulable phosphor sheet, or of the cassette holding the stimulable phosphor sheet, or of a part of the cassette holding the stimulable phosphor sheet, and when the jam detection means detects a jam, operations of the conveyance means are stopped, and information detected by the jam detection means is notified to the user through the notifying means.

Structure (303)

The radiation image reading apparatus described in (302) wherein when the opening/closing detection means detects a change from the state of open to the state of closing, presence of a jam is investigated by the position detecting means and the jam detection means, and when a jam is detected, operations of the conveyance means are kept to be stopped, and information showing that a jam is caused is notified to a user through the notifying means.

In the radiation image reading apparatus described in (303), even when a user makes a opening/closing means to be in the state of closing before finishing jam clearance, forced conveyance ignoring the jam is not conducted by the apparatus, and thereby, the surface of the jammed stimulable phosphor sheet is not hurt, because when the opening/closing detection means detects the state of closing after detecting the state of opening, presence of a jam is investigated by the position detecting means and the jam detection means, and when a jam is detected, operations of the conveyance means are stopped, and information showing that a jam is caused is notified to a user through the notifying means. Further, in this case, it is possible to prevent that the following stimulable phosphor sheet is read accidentally, because the apparatus is stopped. It is further possible to urge the user to clear the jam.

Structure (304)

The radiation image reading apparatus described in (302) wherein when the opening/closing detection means detects the state of closing after detecting the state of opening, the conveyance means conducts initializing operations, and when the position detecting means detects the stimulable phosphor sheet, or the cassette holding the stimulable phosphor sheet, or a part of the cassette holding the stimulable phosphor sheet in the course of the initializing operations, the jam detection means recognizes the jam occurrence, operations of the conveyance means are stopped, and information showing that a jam is caused is notified to a user through the notifying means.

In the radiation image reading apparatus described in (304), even when a user makes a opening/closing means to be in the state of closing before finishing jam clearance, forced conveyance ignoring the jam is not conducted by the apparatus, and thereby, the surface of the jammed stimulable phosphor sheet is not hurt, because when the opening/closing detection means detects the state of closing after detecting the state of opening, the conveyance means conducts initializing operations, and when the position detecting means detects the stimulable phosphor sheet, or the cassette holding the stimulable phosphor sheet, or a part of the cassette holding the stimulable phosphor sheet in the course of the initializing operations, the jam detection means recognizes the jam occurrence, operations of the conveyance means are stopped, and information showing that a jam is caused is notified to a user through the notifying means. Further, in this case, it is possible to prevent that the following stimulable phosphor sheet is read accidentally, because the apparatus is stopped. It is further possible to urge the user to clear the jam.

Structure (305)

The radiation image reading apparatus described in (301) wherein a part of the conveyance means is capable of being operated manually, and is inclined to the direction of opening of the opening/closing means, and the jammed stimulable phosphor sheet, or the cassette holding the stimulable phosphor sheet, or a part of the cassette holding the stimulable phosphor sheet, is made to be capable of being removed from the radiation image reading apparatus by making a part of the conveyance means to be protruded from the surface of the opening.

In the radiation image reading apparatus described in (305), a user can conduct jam clearing processing safely under the condition that a sufficient working space is secured, because a part of the conveyance means makes manual rotational displacements, and is inclined to the direction of opening of the opening/closing means, and the jammed stimulable phosphor sheet, or the cassette holding the stimulable phosphor sheet, or a part of the cassette holding the stimulable phosphor sheet, is made to be capable of being removed from the radiation image reading apparatus by making a part of the conveyance means to be protruded from the surface of the opening.

Structure (306)

The radiation image reading apparatus described in (301) wherein a part of the conveyance means is protruded from the surface of the opening when a part of the conveyance means is manually subjected to the parallel displacement in the direction of the opening of the opening/closing means, and thereby, the jammed stimulable phosphor sheet, or the cassette holding the stimulable phosphor sheet, or a part of the cassette holding the stimulable phosphor sheet, is made to be capable of being removed from the radiation image reading apparatus.

In the radiation image reading apparatus described in (306), a user can conduct jam clearing processing safely under the condition that a sufficient working space is secured, because a part of the conveyance means is protruded from the surface of the opening when a part of the conveyance means is manually subjected to the parallel displacement in the direction of the opening of the opening/closing means, and thereby, the jammed stimulable phosphor sheet, or the cassette holding the stimulable phosphor sheet, or a part of the cassette holding the stimulable phosphor sheet, is made to be capable of being removed from the radiation image reading apparatus.

Each of FIGS. 3(A1a)–3(B2b) is a diagram showing how the back base and the front cover are locked each other.

Each of FIGS. 4(A) and 4(B) is a diagram showing the locking mechanism for the back base and the front cover.

Each of FIGS. 5(A) and 5(B) is a diagram of the back base of a cassette viewed from the rear side.

Figure 6:
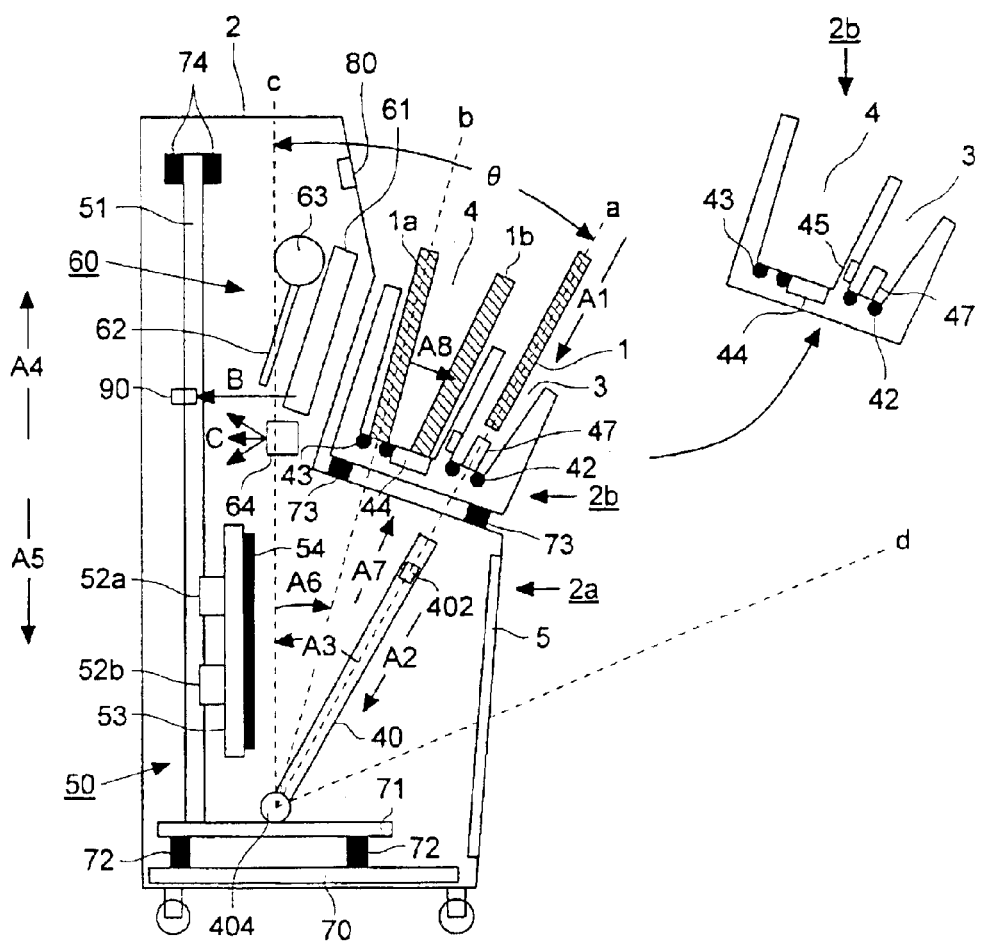

FIG. 6 is a diagram showing an example of the structure of a radiation image reading apparatus.

Figure 7:
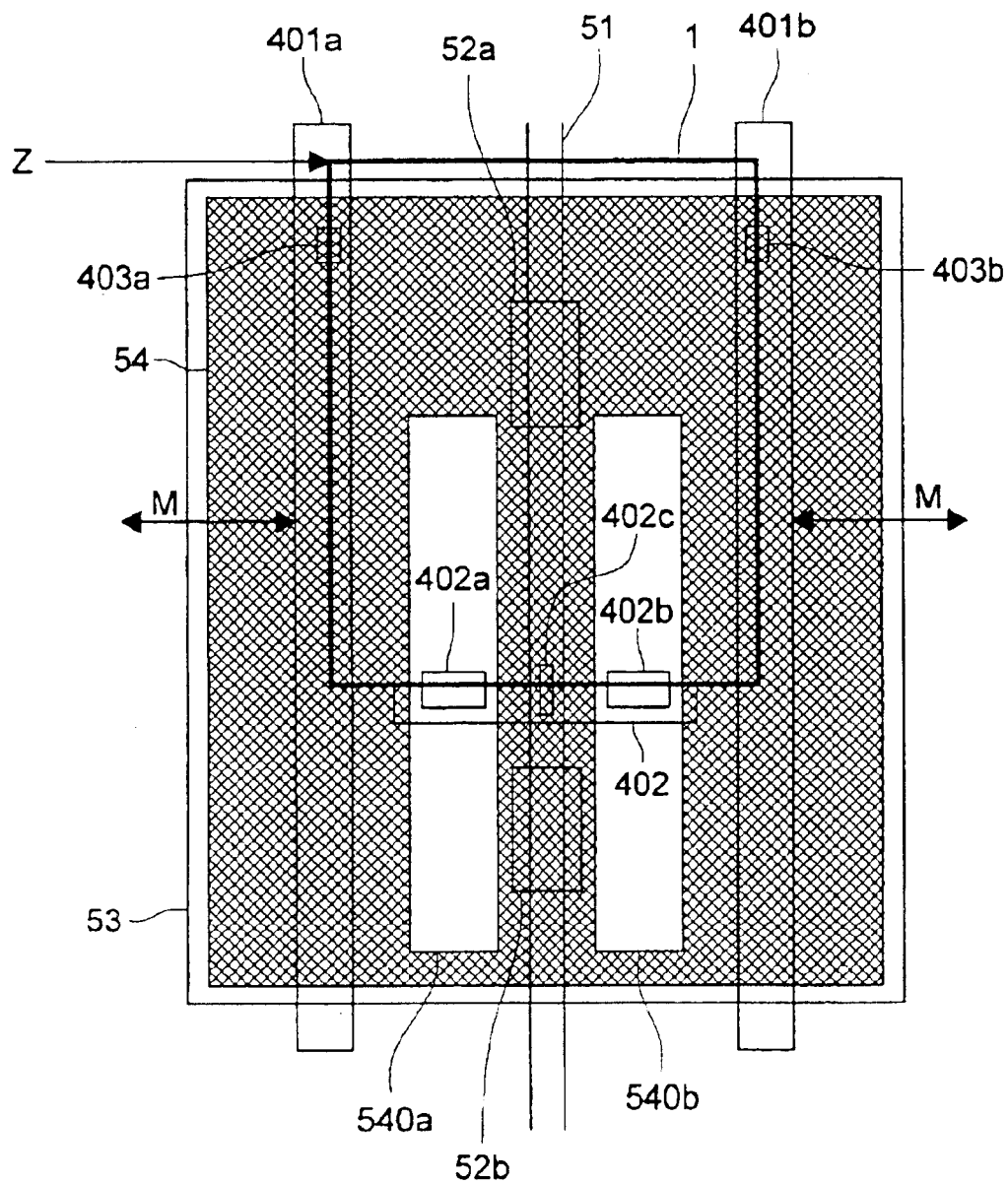

FIG. 7 is a diagram showing the relationship between a conveyance means and a vertical scanning means in the course of transferring of the back base.

Figure 8:
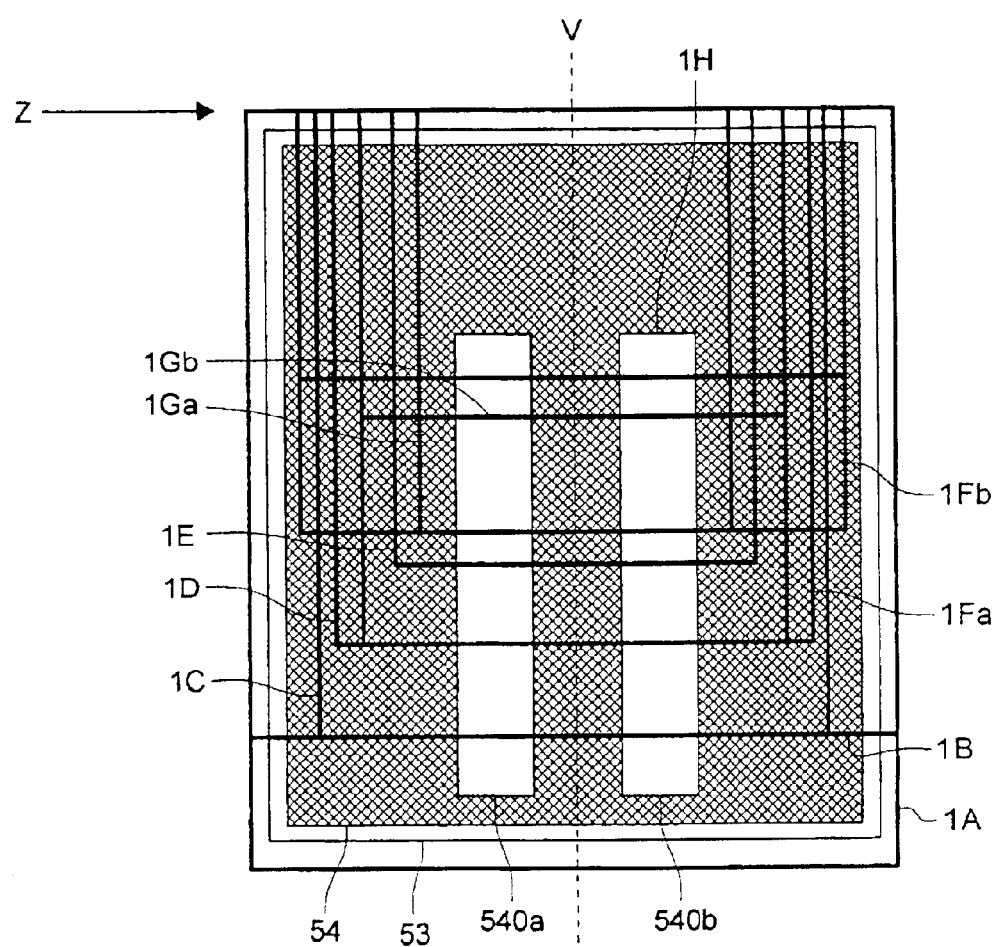

FIG. 8 is a diagram showing the positional relationship of the cassette at an upper side reference and a central reference.

Figure 9:
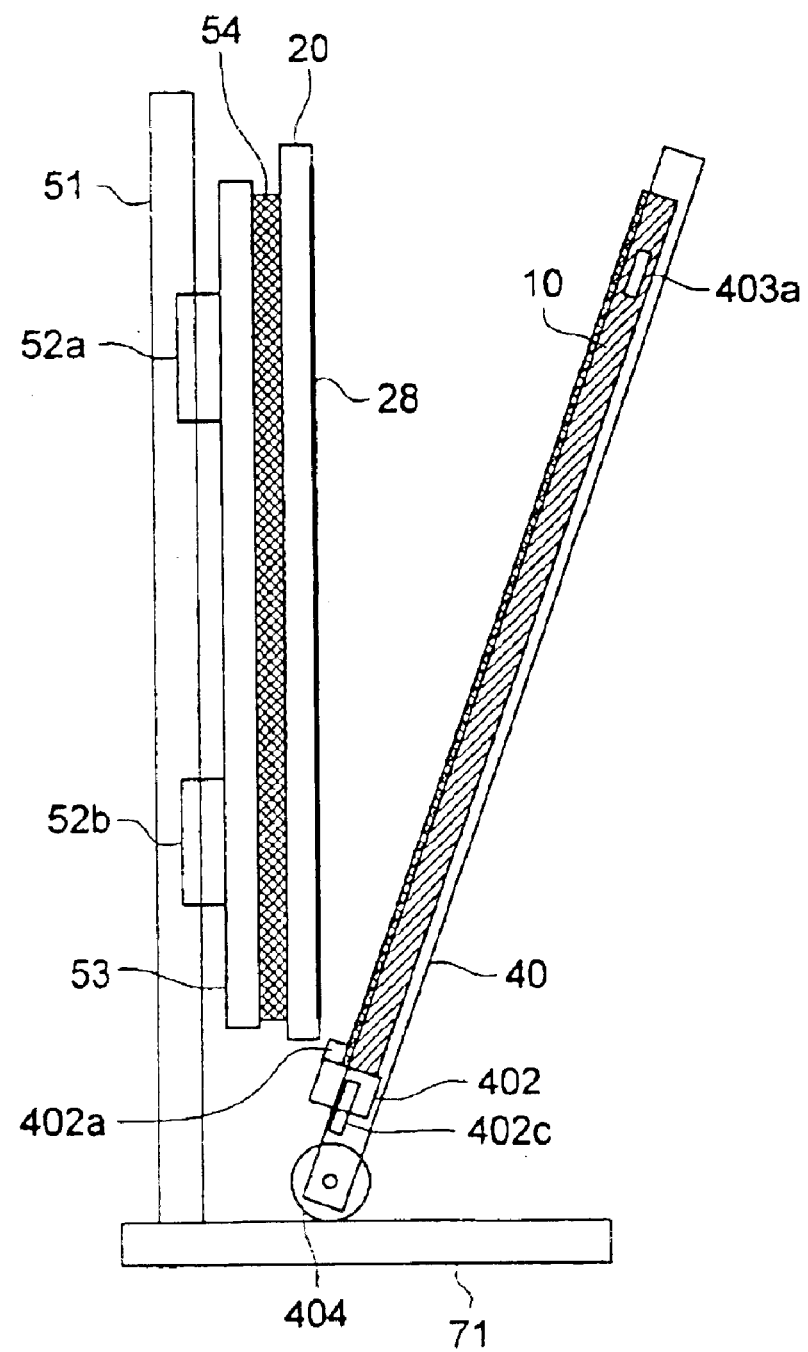

FIG. 9 is a diagram showing the relationship between a conveyance means and a vertical scanning means in the state of standing by Each of FIGS. 10(A1)–(B2) is a diagram illustrating a detecting method for a side end of the back base.

Figure 11:
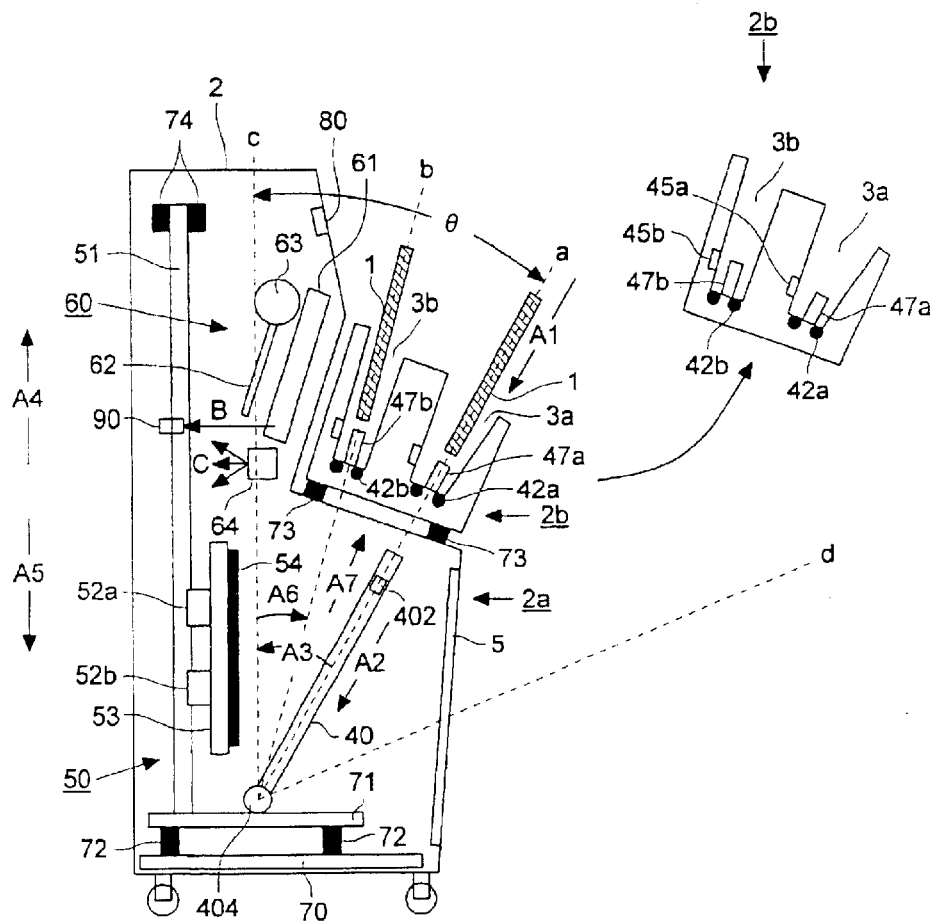

FIG. 11 is a diagram showing an example of another radiation image reading apparatus.

Figure 12:
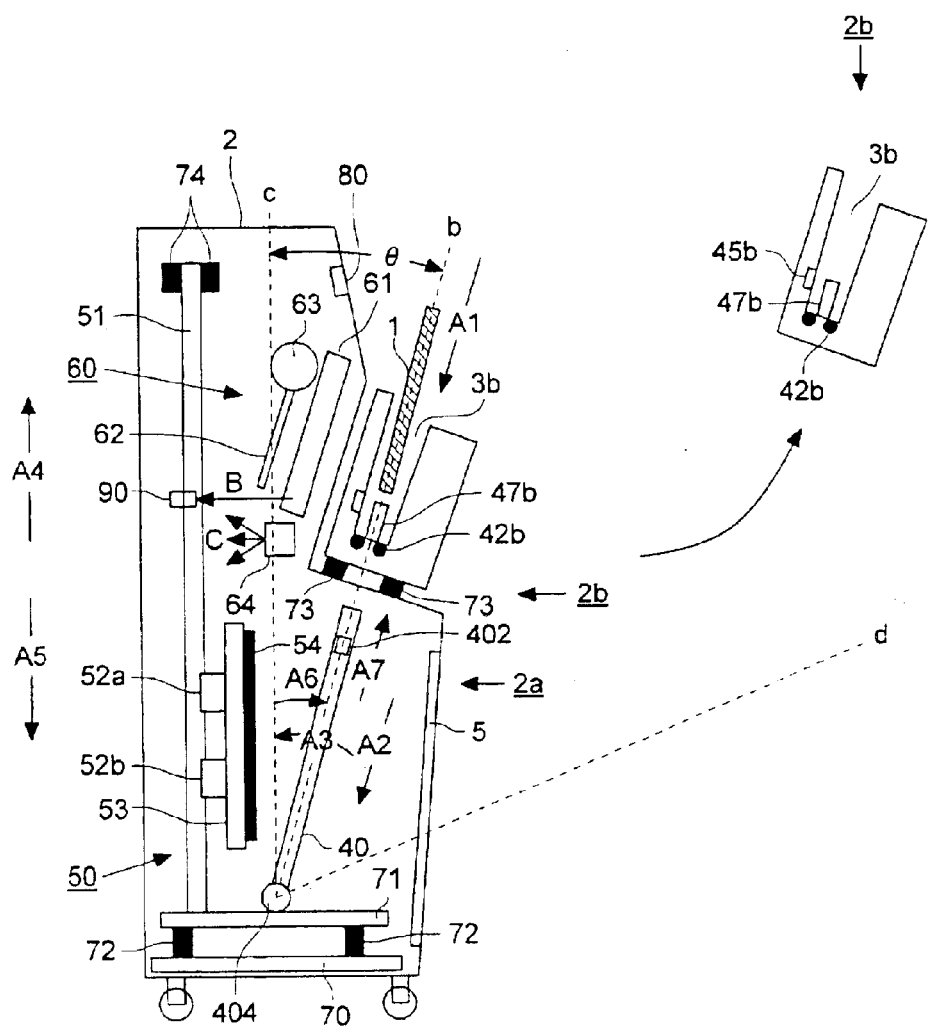

FIG. 12 is a diagram showing an example of another radiation image reading apparatus.

Figure 13C:
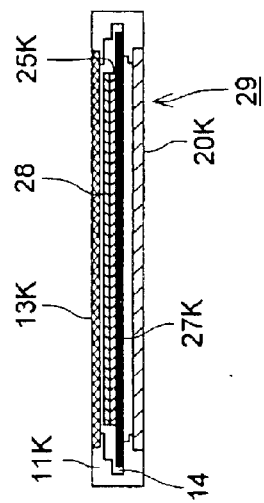
Figure 13B:
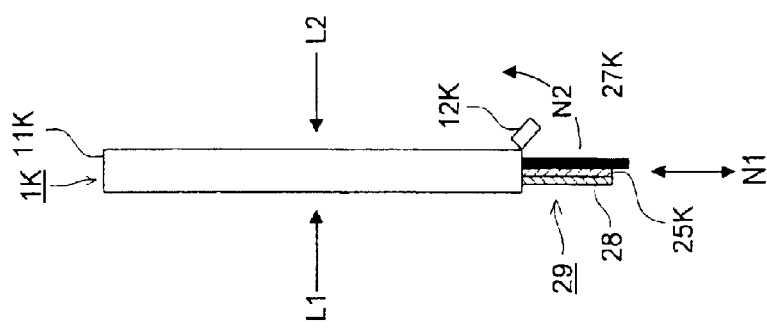
Figure 13A:
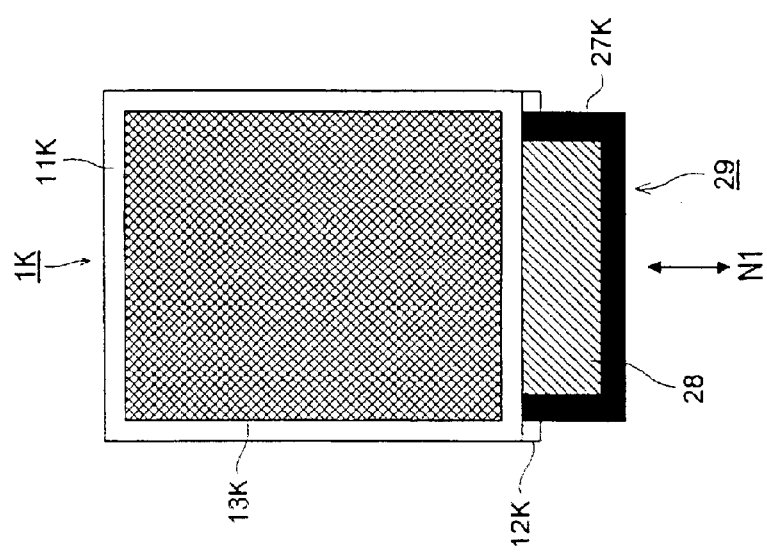

Each of FIGS. 13(A)–13(C) is a diagram showing an example of the structure of another cassette.

Figure 14:
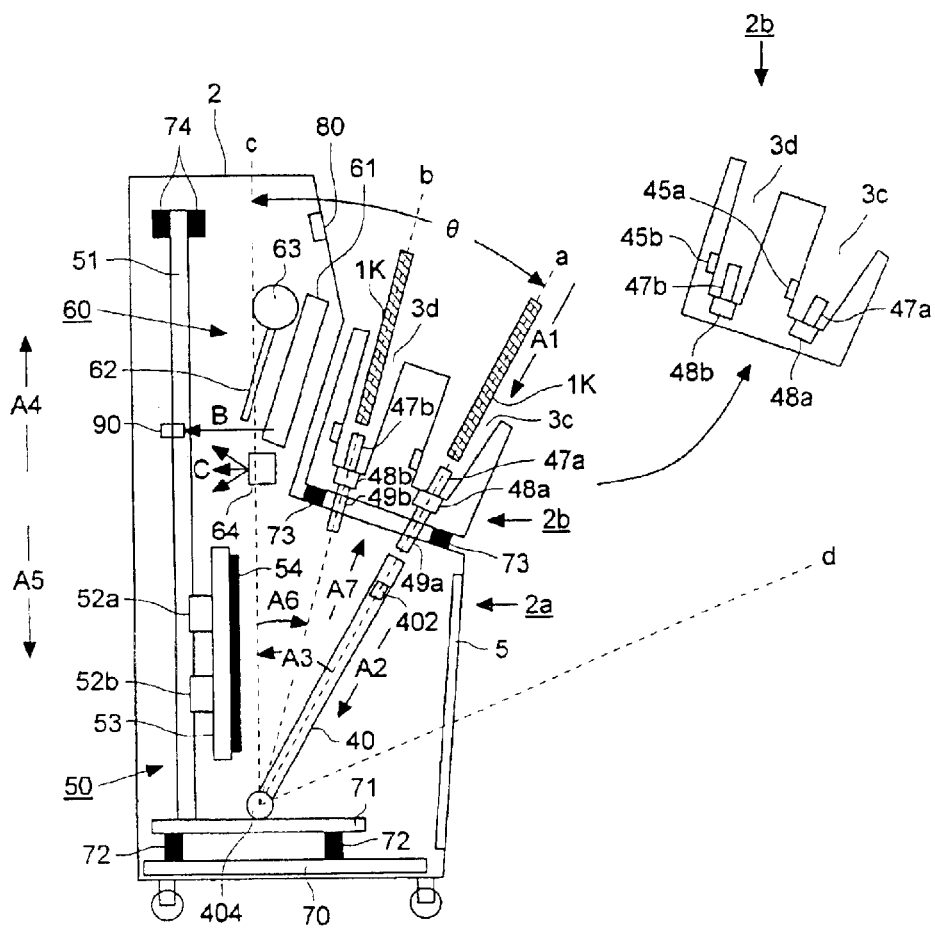

FIG. 14 is a diagram showing an example of another radiation image reading apparatus.

Figure 15:
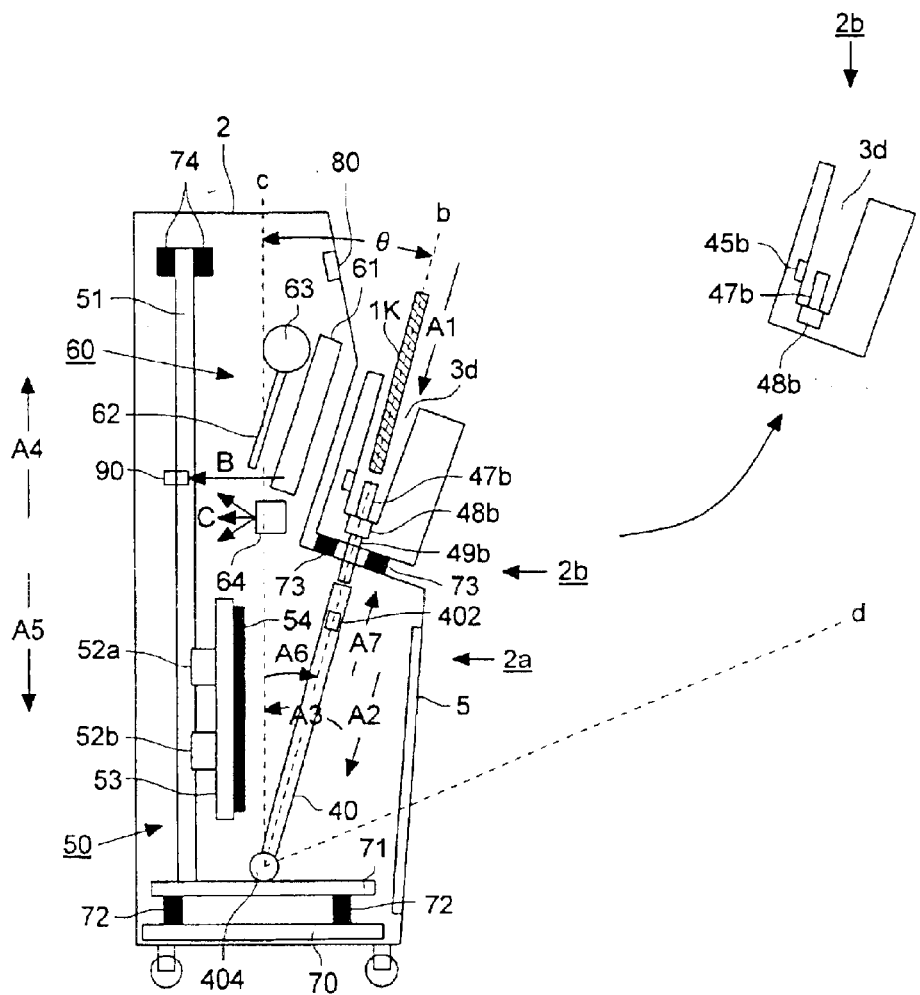

FIG. 15 is a diagram showing an example of another radiation image reading apparatus.

DETAILED DESCRIPTION OF THE PREFERRED EMBODIMENT

An embodiment of the invention will be explained in detail as follows, referring to the drawings. Each of FIGS. 1–5 represents a diagram showing one example of cassette 1 used for a radiation image reading apparatus of the invention.

Figure 1:
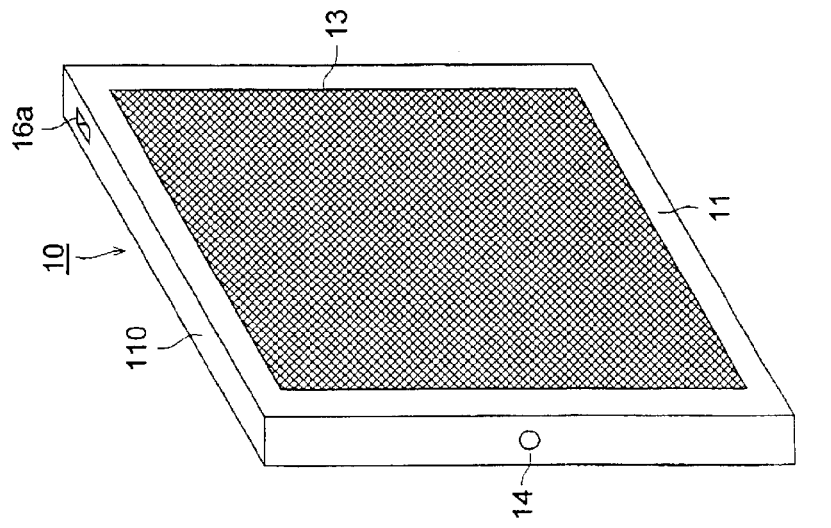
FIGS. 1(A) and 1(B) represent a perspective view of a cassette wherein a front cover is separated from a back base.
Figure 1:
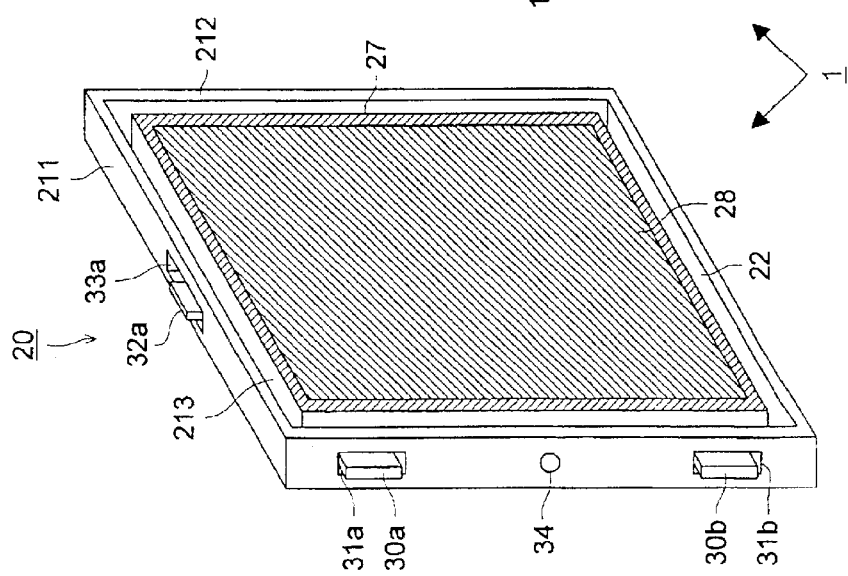
Figure 2:
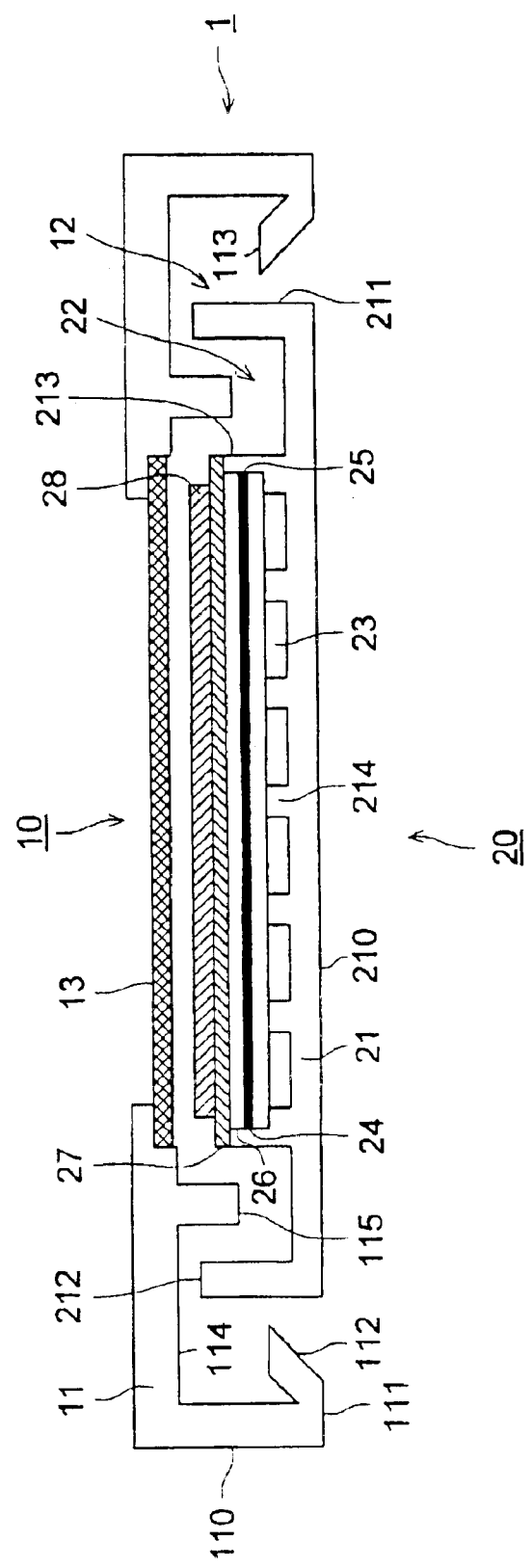
FIG. 2 is a sectional view of a cassette wherein a front cover and a back base are re-assembled.

Cassette 1 is constituted with front cover 10 and back base 20 which are capable of being separated from each other. FIG. 1 represents a perspective view of cassette 1 wherein front cover 10 is separated from back base 20, FIG. 2 is a sectional view of cassette 1 wherein front cover 10 and back base 20 are re-assembled, FIGS. 3 is a sectional view of cassette 1 showing the state of the locking mechanism, FIG. 4 is a diagram showing the locking mechanism of cassette 1, and FIG. 5 is a diagram of back base 20 viewed from the rear side (which is opposite to front cover 10).

The front cover 10 is composed of frame 11 and front surface plate 13. The frame 11 is composed of frame side face 110, frame bottom surface 111, inclined bottom surface 112 having inclination of a prescribed angle, inner facing surface 113, frame inner surface 114, light-shielding projection 115, insertion hole 14, cutouts 15a and 15b and recesses for grip 16a and 16b. Inside the frame 11, recess 12 is formed between the inclined bottom surface 112 and the light-shielding projection 115.

It is possible to design positioning accuracy for re-assembling back base 20 with front cover 10 to be rough by providing the inclined bottom surface 112 in the frame 11. Namely, if the inclined bottom surface 112 is provided in the frame 11, even when the position of the back base 20 is deviated when it is re-assembled with the front cover 10, the inclined bottom surface 112 leads the back base 20 automatically to the re-assembling position. Therefore, the requirement for accuracy for parts and for assembly on the apparatus side can be made loose. Further, even if delicate deformation is caused on the framework and on the mechanism of the apparatus when the apparatus is transported, probability of troubles in the job of re-assembling front cover 10 and back base 20 can be made to be extremely small.

It is preferable that the frame 11 is made of the material such as, for example, aluminum or hard plastic which can stand the large load in the case of full load radiographing, and it is preferable that the front cover 13 is made of material whose absorption of radiation is relatively small, such as, for example, aluminum or carbon fiber reinforced plastic.

In the case of a cassette of the type wherein the side of the cassette is opened and closed, or a side plate of the cassette is drawn out, it is impossible to construct the cassette to be of the structure in which the outer circumference of the side of the cassette is seamless. Therefore, the cassette is of the structure which is weak against the load from the front side. On the other hand, in the present embodiment, the cassette is of the structure in which the frame 11 of the front cover 10 covers the outer circumference of the front surface plate 13 on a seamless basis. Therefore, it is possible for the entire surface of frame 11 to support evenly the load applied from the side of the front cover 10 of cassette 1 in the course of radiographing. Therefore, this structure is extremely strong for the load applied from front cover 10 side.

The back base 20 is composed of back base main body 21, thin plates 24 and 26, lead foil 25, supporting plate 27 and stimulable phosphor sheet 28 (another mechanism will be explained later).

The stimulable phosphor sheet 28 is fixed on the supporting plate 27 which is stuck on the thin plate 26 with a two-sided adhesive tape or adhesives in a way that it can be removed and stuck again. Though the lead foil 25 is interposed and fixed between the thin plates 24 and 26 in the present embodiment, it is also possible to interpose and fix the lead foil 25 between the stimulable phosphor sheet 28 and the supporting plate 27. The thin plates 24 is stuck on rib 214 of the back base main body 21. The rib 214 forms air phase 23 and contributes to the light weight of a cassette. As stated above, the stimulable phosphor sheet 28 is integrally united with the back base main body 21.

When the stimulable phosphor sheet 28 needs to be replaced, it is torn off from thin plate 26 together with supporting plate 27, then, the supporting plate 27 having thereon fresh stimulable phosphor sheet 28 is stuck on the thin plate 26 with a two-sided adhesive tape or adhesives. Since the lead foil 25 is protected by the thin plate 26, the lead foil 25 is not torn off together with the stimulable phosphor sheet 28 and supporting plate 27 when they are torn off.

For easy replacement of the stimulable phosphor sheet 28, it is also possible to use magnetic force for attracting supporting plate 27 to thin plate 26, without sticking the supporting plate 27 on the thin plate 26 with a two-sided adhesive tape or adhesives. For example, the supporting plate 27 may be made of rubber magnet, or rubber magnet is stuck on the back side (the side on which the stimulable phosphor sheet 28 is not pasted), and on the other hand, the thin plate 26 or the surface of the thin plate 26 may be made of ferromagnetic substances. If the aforesaid structure is taken, the supporting plate 27 on which the stimulable phosphor sheet 28 is stuck can be removed easily from the back base 20. Further, the same effect is naturally obtained when the back side of the supporting plate 27 is constituted with a ferromagnetic body and the thin plate 26 is constituted with rubber magnet.

The back base main body is composed of back base reverse surface 210, back base side surface 211, rim 212, inner wall 213 and rib 214. The rim 212 and the inner wall 213 form recessed portion 22.

When the back base 20 and the front cover 10 are re-assembled as in FIG. 2, light-shielding projection 115 of the front cover 10 acts to enter the recessed portion 22 of the back base 20, and the rim 21 of the back base 20 acts to enter recessed portion 12 of the front cover 10. Under this way, external light is shielded so that it may not reach the stimulable phosphor sheet 28. If velvet or sponge, for example, is pasted on the recessed portion 12 of the front cover 10, a light-shielding property can be improved.

A design has been made so that a clearance at a certain level may be formed between an edge of inclined bottom surface 112 of the front cover 10 and back base side surface 211, under the condition that the front cover 10 and the back base 20 are re-assembled. This clearance is one necessary for re-assembling the front cover 10 and the back base 20 smoothly. If a distance of the clearance is about 0.2–2 mm, the front cover 10 and the back base 20 can be re-assembled smoothly enough. In addition, this clearance is important because it absorbs manufacturing errors for the front cover 10 and the back base 20, and it improves reliability and stability of re-assembling operations for the front cover 10 and the back base 20.

In the present embodiment, there is employed a light-shielding method by means of combination of the recessed portion and projected portion as stated above. Therefore, there is no fear that external light enters through the clearance to reach the stimulable phosphor sheet 28 to fog it.

It is preferable that the back base main body 21 is formed by ferromagnetic plastics so that it may be attracted to magnet 54 through magnetic force. Or, the back base main body 21 may be formed with ordinary plastic, and a ferromagnetic sheet (not shown) such as an iron foil may be stuck on the back base reverse surface 210. Or, the method to coat ferromagnetic substances on the back base reverse surface 210 may also be used.

The back base reverse surface 210 has been designed so that it may follow the plane formed by magnet 54 when the back base reverse surface 210 is attracted to the magnet 54. Namely, the back base 20 has rigidity to a certain extent and has flexibility with which the back base can follow the plane formed by magnet 54. When flexibility at a certain level is given to the back base 20 as stated above, the back base 20 follows the plane on the magnet 54 side and thereby, deformation and warping of the back base 20 are corrected, even when the back base 20 is deformed or warped, for example, by aged deterioration or by how it was used. Therefore, the surface of the stimulable phosphor sheet 28 can be kept to be a plane in the course of image information reading.

When there is conducted radiographing (bed radiographing or full load radiographing) wherein a load is applied from the front cover 10 side, there is generated a situation wherein front surface plate 13 of the front cover 10 is warped considerably toward the back base 20 side. In this case, if rigidity of the back base 20 is too high, the back base 20 keeps its flatness, and the stimulable phosphor sheet 28 is pressed considerably from both sides of the front cover 10 and the back base 20, resulting in damage of the stimulable phosphor. As stated above, if the back base 20 has rigidity and flexibility both on a certain level, the back base 20 can be warped to a certain extent in the direction for the back base 20 to escape from pressing from the front cover 20, which results in no damage of the stimulable phosphor.

Rigidity that is more than needed should not given to the back base 20 naturally. If rigidity that is more than needed is given to the back base 20, durability of cassette 1 is lowered. Further, if rigidity that is more than needed is given to the back base 20, an amount of loosening of the back base 20 caused by its empty weight grows greater, resulting in problems of light-shielding capability and flatness on the surface of the stimulable phosphor in the course of radiographing.

Though the front cover 10 and the back base 20 can be separated from each other, they are usually re-assembled as shown in FIG. 2, when radiographing is conducted.

A locking mechanism for the cassette will be explained as follows, referring to FIGS. 3 and 4.

There is provided a locking mechanism on cassette 1 for keeping the front cover 10 and the back base 20 to be re-assembled. A locking claw is represented by 30a, 30b, 30c and 30d of the back base 20, and a tip of each locking claw is structured so that it moves in the direction of arrow Q1 or of arrow Q2 from opening sections 31a, 31b, 31c and 31d in accordance with lock ON/OFF operations. (Shown in FIG. 4(A))

Locking claws represented by 32a and 32b of the back base 20 are different from those represented by 30a, 30b, 30c and 30d. The locking claws 32a and 32b are structured so that they slide in the direction of arrow Q1 or of arrow Q2 in opening sections 33a and 33b in accordance with lock ON/OFF operations.

The state of lock ON means the state wherein tips of locking claws 30a, 30b, 30c and 30d are protruded to the outside from back base side surface 211. Under this state, the tip of the locking claw is in the state to be protruded into the space between frame inner surface 114 and inner facing surface 113 of the front cover 10.

Each of FIG. 3(A1a) and FIG. 3(A1b) shows a sectional view of cassette 1 in dotted lines U1 and U2 in FIG. 4 in the case of the state of lock ON.

In the state of lock ON, tips of locking claws 32a and 32b are in the state wherein they have moved in the direction of arrow Q1. In this case, there is generated the state wherein cutouts 15a and 15b (openings provided on the frame inner facing surface 113 and inclined bottom surface 112) of the front cover 10 do not agree with locking claws 32a and 32b in terms of phase, namely, the state wherein the back base 20 cannot be separated from the front cover 10. Each of FIG. 3(B1a) and FIG. 3(B1b) shows a sectional view of cassette 1 in dotted lines U3 and U4 in FIG. 4 in this case.

The state of lock OFF means the state wherein tips of locking claws 30a, 30b, 30c and 30d are retreated to the inside of back base side surface 211. Under this state, the tip of the locking claw is in the state to be protruded into the space between frame inner surface 114 and inner facing surface 113 of the front cover 10. Each of FIG. 3(A2a) and FIG. 3(A2b) shows a sectional view of cassette 1 in dotted lines U1 and U2 in FIG. 4 in this case. In the state of lock OFF, locking claws 32a and 32b are in the state to agree with cutouts 15a and 15b in terms of phase, and thereby, the back base 20 can be separated from the front cover 10. Each of FIG. 3(B2a) and FIG. 3(B2b) shows a sectional view of cassette 1 in dotted lines U3 and U4 in FIG. 4 in this case.

The locking claws 30a, 30b, 32a and 32b are structured so that they may interlock with connecting member 35. On the other hand, the locking claws 30c and 30d are structured so that they may interlock with connecting member 36. One end of spring 38a is connected with the connecting member 35, and the other end thereof is connected with back base main body 21. The connecting member 35 is constantly urged by the spring 38a to move in the direction of arrow Q1. Insertion hole 14 of front cover 10 is in a positional relationship to match insertion hole 34 of the back base 20 when the front cover 10 and the back base 20 are re-assembled together.

When a bar-shaped member is inserted in the direction of arrow P by pushing it once from insertion hole 14 (insertion hole 34) under the state of lock ON, the connecting member 35 is moved in the direction of arrow Q2 by a prescribed distance and stops there, resulting in the state of lock OFF shown in FIGS. 3(A2a) and 3(A2b).

When the connecting member 35 is moved in the direction of arrow Q2, a form of a rack on the tip of each of connecting members 35 and 36 and pinion 37 generate rack/pinion operations, and thereby, the connecting member 36 is also moved in the direction of arrow R2 by the same distance, and stops. In this case, locking claws 32a and 32b are also interlocked with the connecting member 35 to be moved in the direction of arrow Q2 by the same distance, and stops there, resulting in the state of lock OFF shown in FIGS. 3(B2a) and 3(B2b).

When a bar-shaped member is inserted and pushed in the direction of arrow P once from insertion hole 14 (insertion hole 34) under the state of lock ON, the state of lock OFF is generated, and the front cover 10 and the back base 20 are brought into the state wherein both of them can be separated from each other. Then, as long as the bar-shaped member is not made to act from the insertion hole 14 (insertion hole 34), the state of lock OFF is maintained.

When a bar-shaped member is inserted and pushed in the direction of arrow P once from insertion hole 14 (insertion hole 34) under the state of lock OFF, the connecting member 35 is moved in the direction of arrow Q1 by a prescribed distance and stops there, resulting in the state of lock ON shown in FIGS. 3(A1a) and 3(A1b).

When the connecting member 35 is moved in the direction of arrow Q1, the rack/pinion operations mentioned above are generated, and thereby, the connecting member 36 is also moved in the direction of arrow R1 by the same distance, and stops there. In this case, locking claws 32a and 32b are also moved in the direction of arrow Q1 by the same distance, resulting in the state of lock ON shown in FIGS. 3(B1a) and 3(B1b).

Namely, when a bar-shaped member is inserted and pushed in the direction of arrow P once from insertion hole 14 (insertion hole 34) under the state of lock OFF, the state of lock ON is generated, and the front cover 10 and the back base 20 are brought into the state wherein both of them cannot be separated from each other. Then, as long as the bar-shaped member is not made to act from the insertion hole 14 (insertion hole 34), the state of lock ON is maintained.

As stated above, for cassette 1 of the present embodiment, there is employed a method (push-latch method) wherein the state of lock ON and the state of lock OFF are switched each time a bar-shaped member is inserted and pushed from insertion hole 14 (insertion hole 34). The push-latch method is known well as a mechanism used to push-out/pull-in a tip of the ball-point pen out of the ball-point pen body. The push-latch mechanism is housed in push-latch section 39. One end of spring 38b is connected to the push-latch section 39, and the other end thereof is connected to the back base main body 21. The push-latch section 39 is constantly urged by the spring 38b to move in the direction of arrow Q1.

Cutouts 15a and 15b on the front cover 10 and locking claws 32a and 32b are arranged to be away from central position C (position shown with arrow C) on the flank side of cassette 1 by respective prescribed distance. Due to the arrangement of the cutouts 15a and 15b as well as the claws 32a and 32b wherein they are shifted from the central position C on the flank side of cassette 1 (however, if either one of a pair of locking claw 32a and cutout 15a and a pair of locking claw 32b and cutout 15b is arranged to be shifted from central position C on the flank side of cassette 1, the other pair can be arranged on the central position C on the flank side of cassette 1), the back base 20 and the front cover 10 cannot be re-assembled unless they are in the correct direction. Due to this, it is possible to avoid the risk that the back base 20 and the front cover 10 are re-assembled in the wrong direction when, for example, a user makes the cassette 1 to be in the unre-assembled state for the reasons of cleaning the inside of the cassette and of replacement of stimulable phosphor sheet 28, and then wishes to re-assemble them again after completion of the cleaning and replacement.

A mechanism for avoiding the risk to re-assemble back base 20 and front cover 10 in the wrong direction as stated above is called an inverse insertion preventing mechanism.

By providing at least one projection on either one of frame 11 (for example, an inner surface of frame side surface 110 and inclined bottom surface 112) of the front cover 10 and an outer circumference (for example, an outer surface of the back base side 211) of the back base, and by providing at least one recess on the other, and by arranging the projection and the recess so that the front cover 10 and the back base 20 can be re-assembled only when they confront each other in the correct direction, the inverse insertion preventing mechanism can be created simply.

For example, by providing a projection in the same shape as in each of locking claws 32a and 32b on the outer surface of the back base side 211 and providing a recess in the same shape as in each of cutouts 15a and 15b on the frame 11 of front cover 10, and by arranging the projection and the recess to be in the same positional relationship as that for locking claws 32a and 32b and cutouts 15a and 15b in the state of lock OFF, the inverse insertion preventing mechanism can be created simply.

If the locking mechanism is structured only with locking claws 30a, 30b, 30c and 30d (under the condition of no locking claws 32a and 32b), when the cassette 1 is held so that front cover 10 faces upward in the vertical direction, a side of the back base 20 having thereon no locking claw faces downward in the vertical direction and is loosened because of empty weight of the back base 20. Thus, the locking mechanism composed of the locking claws 32a and 32b can serve also as a mechanism to prevent that the back base 20 is loosened by its empty weight (loosening prevention mechanism).

However, this loosening prevention mechanism is not always needed for relatively small cassette 1 in which the back base 20 hardly has loosening caused by its empty weight.

Further, though each of insertion holes 14 and 34 is indicated to be a circular form in the present embodiment, each of the insertion holes 14 and 34 is not limited to be a circular form. For example, each of the insertion holes 14 and 34 may be in the form of a rectangle or of an elongated hole.

FIG. 5 is a diagram showing back base 20 of cassette 1 viewed from the rear side of the back base (the side that is opposite to front cover 10). FIG. 5(A) shows the state of lock ON, and FIG. 5(B) shows the state of lock OFF. Lock state indicating means 203 is arranged to be interlocked with connecting member 35 to operate, and the lock state indicating means 203 positioned below opening section 202 under the state of lock ON moves to the upside of the opening section 202. Since the position of the lock state indicating means 203 can be observed from the outside of cassette 1 through the opening section 202, the state of lock of cassette 1 can be watched from the outside by means of a sensor. By watching the state of lock of cassette 1 from the outside by means of a sensor as stated above, it is possible to confirm whether the locking mechanism operates correctly when front cover 10 and back base 20 are separated from each other or re-assembled together. When the locking mechanism is not operating correctly, it is possible to retry separating operations or re-assembling operations, or to indicate an error message on a prescribed display means.

On the same side as that for insertion hole 34 on the back base rear surface 210, there is pasted (or housed) code storage element 200. Clip 201 is arranged on the side opposite to that for the code storage element 200 on the back base rear surface 210.

In the present embodiment, the code storage element 200 is an element which makes it possible to read a code written in the code storage element 200 by using a radio technology such as an electromagnetic wave or a microwave. When the element which makes it possible to read a code by using radio technology such as an electromagnetic wave or a microwave is used, it is possible to read accurately the code recorded on the code storage element 200 even when the code storage element 200 is deviated in terms of positional relationship from a reading apparatus for the code storage element 200, which is convenient. As an element of this kind, non-contact ID label (S label), for example, can be used. On the code storage element 200, there are recorded an identification number (ID number) of stimulable phosphor sheet 28 and a date of manufacturing thereof, a version number of a stimulable phosphor sheet and a number indicating a size of a cassette, as a code.

The code storage element 200 may also be a sheet on which a pattern that can be read optically is printed. For example, a bar code label is known well.

It is preferable that the code storage element 200 is arranged on the center line in the lateral direction for conveyance of cassette 1 as shown in FIG. 5(A), or arranged on the parallel line that is away from the center line in the lateral direction for conveyance of cassette 1 by fixed distance X as shown in FIG. 5(B). A value of X is always constant, independently of a cassette size.

When reading a code written in the code storage element 200 by using a radio technology such as an electromagnetic wave or a microwave, the code storage element 200 may also be arranged inside the back base 20, without being arranged on the back base rear surface 210. Since reading and writing are conducted through a radio technology, the code storage element 200 does not need to be present on the back base rear surface 210. In this case, if there is pasted on the back base rear surface 210 a label on which an identification number (ID number) of stimulable phosphor sheet 28 is printed, it is intelligible because it can be recognized visually.

Further, it is more convenient if a bar code reading method and a method to read through a radio technology are used jointly. In this case, it is important that contents of a bar code label are corresponded to contents recorded on the element that is read by a radio technology.

FIG. 6 is a diagram showing an embodiment of a radiation image reading apparatus of the invention.

On apparatus main body 2, there are provided cassette insertion inlet 3 and cassette ejection outlet 4. The apparatus main body 2 is composed of two units including conveyance reading section 2a and cassette insertion ejecting section 2b, and the cassette insertion ejecting section 2b is of the structure wherein it can be removed simply from the conveyance reading section 2a. Further, vibration control rubber 73 is arranged between the conveyance reading section 2a and the cassette insertion ejecting section 2b to form a vibration control structure wherein a vibration caused by cassette insertion/ejection is hardly transferred to the conveyance reading section 2a.

Further, vertical scanning means 50 in the cassette insertion ejecting section 2b and conveyance means 40 are provided on the same base plate 71. Vibration control rubber 72 is arranged between the base plate 71 and bottom plate 70 to realize a vibration control structure wherein a vibration of the cassette insertion ejecting section 2b is not transferred to the vertical scanning means 50.

Further, vibration control rubber 74 is arranged between the top end of the vertical scanning means 50 and an unillustrated apparatus frame to reinforce the vibration control structure for the vertical scanning means 50.

The vibration control structure mentioned above makes it possible to prevent that a noise is caused by vibration in image information obtained through reading, even when a cassette is inserted in insertion inlet 3, or a cassette is taken out of ejection outlet 4, and apparatus main body 2 is vibrated, while image information is read from stimulable phosphor sheet 28 by the conveyance reading section 2a.

Since the vertical scanning means 50 and the conveyance means 40 are provided on the same base plate 71, a transfer position is not deviated when back base 20 is transferred from the conveyance means 40 a to the vertical scanning means 50, as stated later. Due to this, separating operations and re-assembling operations for front cover 10 and back base 20 can be conducted stably and accurately.

Next, operations of the radiation image reading apparatus of the invention will be explained as follows, referring to FIGS. 6–9.

As shown in FIG. 6, the cassette 1 which has been subjected to radiographing for radiation image is inserted in insertion inlet 3 in the direction of arrow A1. In this case, the cassette is inserted so that insertion hole 14 may be positioned at the bottom side and front surface plate 13 of front cover 10 may face downward. Namely, the cassette is inserted so that the surface to be read on stimulable phosphor sheet 28 may face downward obliquely. After the cassette 1 is inserted into the insertion inlet 3, presence of the cassette 1 is recognized by a cassette detection sensor (not shown), and the cassette is moved laterally to the center of the insertion inlet 3 by width-adjusting means 47 arranged on the insertion inlet 3.

After the cassette is moved to the center of the insertion inlet 3, code storage element 200 attached on the back base rear surface 210 (or housed in back base 20) and code reading means 45 agree in terms of position, and thereby, a code recorded on the code storage element 200 is read by the code reading means 45.

When the code reading means 45 cannot read a code, or when a code which cannot be identified is read, a cause therefor is judged to be either one of the following, 1) the cassette 1 was inserted upside down,
2) the cassette 1 was inserted inside out,
3) a wrong cassette or an accidental object was inserted,
4) a code recorded on code storage element 200 was broken,
5) code storage element 200 is not pasted (or, it is not positioned correctly)

and an error message is displayed on display means 80 (for example, a liquid crystal display) and a warning sound is generated. The cassette 1 is not taken in the apparatus main body 2 in this case.

When a code is read correctly by the code reading means 45, a cassette size is detected from the code obtained through reading, and a width of the conveyance means 40 is adjusted to the cassette size to start adjustment. Namely, width-adjusting means 401*a* and 401*b* start moving in the direction of arrow M to match the size of cassette 1.

Then, insertion roller 42 is operated and the cassette 1 is taken in the inside of apparatus main body 2 in the direction of arrow A2 along dotted lines a. The conveyance means 40 is already on standby at the position shown with dotted lines when insertion roller 42 is operated, and it accepts the cassette 1 that is conveyed from insertion inlet 3 by insertion roller 42. When cassette grips 402*a* and 402*b* on elevator stand 402 (that moves along the conveyance means 40) catch the bottom end of the cassette 1, the elevator stand 402 conveys the cassette 1 in the direction of arrow A2 along the conveyance means 40, and it is controlled so that the cassette 1 may be stopped when its upper end comes to the position shown with arrow Z in FIGS. 7 and 8.

FIG. 8 is a diagram showing how cassettes each being different in size are positioned on the conveyance mechanism 40. A cassette in a size of 345×430 mm is represented by 1A, a cassette in a size of 385×390 mm is represented by 1B, a cassette in a size of 279×354 mm is represented by 1C, a cassette in a size of 251×302 mm is represented by 1D, a cassette in a size of 200×251 mm is represented by 1E, a cassette in a size of 24×30 cm is represented by 1F*a*, a cassette for mammography in a size of 24×30 cm is represented by 1F*b*, a cassette in a size of 18×24 cm is represented by 1G*a*, a cassette for mammography in a size of 18×24 cm is represented by 1G*b*, and a cassette for dental surgery in a size of 15×30 cm is represented by 1H. The elevator stand 402 is controlled in terms of position so that the upper end comes to the position shown with arrow Z for all cassettes, independently of their sizes. Let it be assumed that the method to control so that the upper end of the cassette 1 may stop constantly at the same position on the conveyance means 40 as stated above is called the control of upper side reference.

The control of upper side reference has the following two advantageous points. p1 1) The time required for vertical scanning means 50 to convey the back base 20 to reading position B can be minimized, independently of a cassette size, and throughput of the apparatus can be improved accordingly.

2) Since the top end of the back base 20 can be protruded from the vertical scanning moving plate 53 by the same distance, independently of a cassette size (see FIGS. 7 and 8), an upper end and a side end of the back base 20 can be detected. This makes it possible to determine a reading area of stimulable phosphor sheet 28 accurately. It is further possible to realize a mechanism that is rough and inexpensive, by lowering accuracy of conveyance for cassette 1 by conveyance means 40 and by lowering accuracy for transferring the back base 20 from the conveyance means 40 to the vertical scanning means 50.

It is naturally possible to employ the method of the control of lower side reference, namely the method to control the position of cassette elevator stand 402 so that the bottom end of cassette 1 may always be stopped at the same position of conveyance means 40. In this case, however, it is impossible to obtain the aforesaid two advantageous points.

Dotted line V in FIG. 8 is a center line of vertical scanning movement plate 53. Width-adjusting means 401*a* and 401*b* are controlled so that centers of all cassettes may agree positionally with the center line of vertical scanning movement plate 53. This is called a control of center reference.

As a general rule, when conveying a film or conveying a stimulable phosphor sheet, there is employed a control of one side reference wherein each of the film and the stimulable phosphor sheet is positioned to its one side when it is conveyed. In the present embodiment, conveyance means 40 and vertical scanning means 50 are required to handle various sizes of cassette 1 and back base 20. Therefore, if the control of one side reference is employed, a position of the center of gravity in the horizontal direction for each of cassette 1 and back base 20 does not agree with a center of each of the vertical scanning movement plate 53 and elevator stand 402, and a balance for vertical scanning and conveyance is lost. In addition, each of cassette 1 and back base 20 is an object which is considerably heavy compared with a film and a stimulable phosphor sheet, and therefore, poor balance of the control of one side reference is undesirable from the viewpoints of reliability and stability. In the present embodiment, therefore, the control of center reference is preferable.

When transferring back base 20 between conveyance mechanism 40 and vertical scanning mechanism 50, cassette grips 402*a* and 402*b* interfere with vertical scanning movement plate 53 (or magnet 54). As a measure to avoid this, there are provided interference avoiding openings 540*a* and 540*b* on the vertical scanning movement plate 53. In the case of the control of one side reference, a position of the interference avoiding opening cannot be specified and more complicated mechanism is needed, which also makes the control of center reference to be preferable in the present embodiment.

Though the control of center reference is employed in the present embodiment, substances of the invention are not lost if there is employed a control of one side reference wherein the aforesaid problems are avoided.

When cassette 1 is stopped in accordance with the control of upper side reference, a tip of each of grips 403*a* and 403*b* is inserted in a recess of each of recess for grips 16*a* and 16*b* existing on front cover side face 110 to create the state in which the front cover 10 is fixed on conveyance means 40.

The conveyance means 40 has rotating shaft 404, and can conduct rotational displacement freely in a range (range of angle θ) of at least from dotted line "a" to dotted line "c". After the cassette 1 is taken into apparatus main body 2 by conveyance mechanism 40, the conveyance mechanism 40 rotates on the rotating shaft 404 in the direction of arrow A3 from dotted line "a" to dotted line "c". After the conveyance mechanism 40 rotates to dotted line "c", back base reverse side 210 of the cassette 1 having a ferromagnetic body is attracted to magnet 54 by magnetic force.

FIG. 7 shows that the back base reverse side 210 of the cassette 1 is attracted to magnet 54 by magnetic force. In the present embodiment, a cassette in 203×254 mm size is assumed in the diagram. Width-adjusting means 401*a* and 401*b* arrange the cassette in 203×254 mm size to the center reference. Width-adjusting means 401*a* and 401*b*, cassette grips 402*a* and 402*b*, lock pin 402*c* and elevator stand 402 are designed so that they may not be protruded from back base reverse side 210 of the cassette 1 toward the vertical scanning movement plate 53 side for preventing their interference with the vertical scanning movement plate 53. Further, for preventing interference of cassette grips 402*a* and 402*b* with the vertical scanning movement plate 5 (or magnet 54), there are provided interference avoiding openings 540a and 540b on the vertical scanning movement plate 53.

On elevator stand 402, there is arranged lock pin 402c which turns on and turns off the locking mechanism of the cassette 1, and an up-and-down movement of the lock pin 402c can turns on and turns off the locking mechanism of the cassette 1. With regard to an upper end of the cassette 1 (upper side reference position Z), for the purpose of detecting an upper end or a side end of the cassette 1 in the course of vertical scanning, the upper end of the cassette 1it is structured to be protruded upward from the vertical scanning movement plate 53 of the vertical scanning means 50.

The vertical scanning means 50 is composed of vertical scanning rail 51, vertical scanning movable sections 52a and 52b, the vertical scanning movement plate 53 and magnet 54. The vertical scanning movement plate 53 is fixed on the vertical scanning movable sections 52a and 52b, and an unillustrated driving portion makes the vertical scanning movement plate 53 to be moved up and down along vertical scanning rail 51. As a vertical scanning rail 51, a linear guide and a linear bearing guide both having high conveying capability can be used.

In the present embodiment, magnet 54 is a rubber magnet (permanent magnet) having a prescribed area. With regard to the rubber magnet, a sheet having thereon interference avoiding openings 540a and 540b as shown in FIG. 7 may be pasted on the entire surface of the vertical scanning movement plate 53, or, the rubber magnet may be pasted on vertical scanning movable portions 52 after being divided into a prescribed number of sheets. Further, the rubber magnet can take an optional shape. In addition, a permanent magnet or an electromagnet other than the rubber magnet can also be used.

The surface of magnet 54 to which the back base reverse side 210 is attracted has high flatness, and when the back base reverse side 210 is attracted to the magnet 54, the surface of a ferromagnetic body of the back base reverse side 210 follows the plane of the magnet 54, thus, the surface of stimulable phosphor sheet 28 to be read is considered to be a perfect plane as far as possible. Therefore, even when the back base 20 is deformed or warped, back base reverse side 210 is corrected in terms of deformation and warp when attracted to the magnet 54, thus, the surface of stimulable phosphor sheet 28 to be read can secure the flatness.

When the back base 20 is attracted to the magnet 54, lock pin 402c housed in elevator stand 402 rises and a tip of the lock pin 402c is inserted into insertion hole 14 of front cover 10 (see FIG. 7). Due to this operation, the state of locking cassette 1 which has been in the state of lock ON is canceled, and moves to the state of lock OFF. Namely, back base 20 and front cover 10 result in the state to be separated from each other. After the cassette 1 moves to the state of lock OFF, the pin 402c goes down to be housed in elevator stand 402 again.

When the cassette 1 is unlocked and moves to the state of lock OFF, the conveyance mechanism 40 rotates in the direction of arrow A6 and stops at the standby position (for example, position shown with dotted line "b"). Owing to this operation, back base 20 can be separated completely from front cover 10.

FIG. 9 is a diagram wherein the back base 20 is separated completely from the front cover 10, and the conveyance mechanism 40 is stopped at the standby position. The size of the cassette 1 is assumed to a 356×432 mm size. By making the front cover 10 to be away from the back base at a sufficient angle, it is possible to prevent that the back base 20 and the front cover 10 interfere each other when the back base 20 conducts vertical scanning operations. A means to conduct a series of operations to separate the back base 20 from the front cover 10 as stated above is called a separating means.

When the back base 20 is separated completely from the front cover 10 by the separating means, an unillustrated driving section operates, and the back base 20 is conveyed (vertical scanning) in the direction of arrow A4 (upward). In the course of vertical scanning operations, stimulable phosphor sheet 28 is subjected to horizontal scanning in the direction perpendicular to the vertical scanning direction by laser beam B emitted from laser scanning unit 61.

When a laser beam acts on the stimulable phosphor sheet 28, stimulated light (image information) that is in proportional to radiation energy accumulated in the stimulable phosphor sheet 28 is emitted, and this stimulated light is collected to light-converging tube 63 through optical guide 62. With regard to light-converging tube 63, it is preferable to use one having the structure described, for example, in TOKUGANSHO No. 2000-103904. On the end face of the light-converging tube, there is arranged a photoelectric conversion element such as an unillustrated photomultiplier which converts the stimulated light thus collected into electric signals. The stimulated light converted into an electric signal is subjected to a prescribed signal processing as image data, and then, is outputted from the apparatus main body to image outputting apparatuses (not shown) such as operation terminals, image storage apparatuses, image display apparatuses and dry imagers, through an unillustrated communication cables. A means to read image information composed by laser scanning unit 61, optical guide 62, light-converging tube 63 and a photoelectric conversion element is defined as reading means 60. The reading means 60 can naturally be attained by the structure other than those in the present embodiment, provided that the reading means is one for reading image information from the stimulable phosphor sheet 28.

It is preferable that the start time for taking in image data is determined by detecting the upper end of back base 20 with sensor 90. When the back base 20 is not present, the sensor 90 receives laser beam B and keeps outputting signals having a prescribed intensity, but when the upper end of the back base 20 moves to the position where the upper end blocks the laser beam B, the upper end of the back base 20 becomes possible to be detected, because signal output intensity of electric signals outputted from the sensor 90 is lowered.

It is also possible to arrange so that a side end of the back base 20 is detected in the mechanism shown in FIG. 10. FIG. 10(A1) is a diagram showing the state where the back base 20 has not arrived at the scanning position of laser beam B. On the light receiving surface of the sensor 90, there is connected rod 91, and laser beam B reaches the sensor 90 through the rod 91. Laser beam arrived at the sensor 90 is converted phtoelectrically by the sensor 90 and is outputted as an electric signal.

The rod 91 is a hollow and tubular one having an opening section for guiding laser beam B, for example, and a substance that diverges light is coated on at least an inner wall section of the tube that is directly acted by the laser beam B. Rod 91 is a bar-shaped plastic member or a glass member, for example, and a substance that reflects or diverges light is coated on the outer wall other than the opening that guides the laser beam B.

FIG. 10(B1) is a diagram showing signal intensity of an electric signal outputted from the sensor 90 under the condition shown in FIG. 10(A1). The signal intensity rises at time T0, then the intensity falls gradually with a laps of time, and diminishes at time T2, namely at the time when laser beam B passes through the right end of the rod 91.

FIG. 10(A2) is a diagram showing the moment when the upper end of the back base 20 has arrived at the scanning position of laser beam B. The signal intensity of the electric signal outputted from the sensor 90 in this case is indicated by FIG. 10(B2). Though the signal intensity rises at time T0, it suddenly falls at time T1, namely at the moment when the laser beam M passes through the left end of the cassette 1. Therefore, if the time T1 is detected with signal processing or the like, the side end (left end in the case of the present example) of the cassette 1 can be detected, and thereby, it is possible to control HSync of a laser beam and to calculate generating timing for image data.

As stated above, if the upper end or the side end of the back base 20 can be detected, an area to be read for the stimulable phosphor sheet 28 can be determined accurately. Further, by using a detection means for an end portion of the back base 20, it is possible to realize a rough and inexpensive mechanism by lowering conveyance accuracy for cassette 1 at conveyance means 40 and by lowering transferring accuracy for back base 20 from conveyance means 40 to vertical scanning means 50.

It is preferable that the laser intensity for detecting an upper end or a side end of back base 20 is lower than that for reading stimulable phosphor sheet 28. The ground for this lies in that a laser beam is reflected inside the apparatus, and stimulable phosphor sheet 28 which has not yet been read is excited by the reflected laser beam.

After completion of reading of image information from stimulable phosphor sheet 28, an unillustrated driving section starts conveying back base 20 in the direction of arrow A5 (downward). While the back base 20 is being conveyed in the direction of arrow A5, erasing light C is emitted from erasing means 64, and it erases image information remaining in the stimulable phosphor sheet 28. As an erasing lamp used for the erasing means 64, a halogen lamp, a highly bright fluorescent lamp and LED array can be used.

Since the present embodiment is structured so that image information may be read in the going travel (upward conveyance) of vertical scanning means 50, and remaining image information may be erased in the returning travel (downward conveyance) of the vertical scanning means, as stated above, the time required for reciprocation of the vertical scanning means can be used effectively without being wasted. Due to this, processing capacity (throughput) of a radiation image reading apparatus can be improved.

Since erasing means 64 is arranged to be positioned under the reading means vertically in the present embodiment, it is possible to switch the moving direction of vertical scanning means 50 to the direction of the returning travel (downward) immediately after the reading means 60 finishes reading image information. Due to this, erasing operations can be started without loss of time in the course of reciprocation of vertical scanning means 50, thus, processing capacity (throughput) of a radiation image reading apparatus can be further improved.

By arranging erasing means 64 to be under the reading means 60 vertically, the bottom end of the back base 20 does not pass through reading position B on the reading means 60, which makes it possible to prevent in advance the accident that the bottom end of the back base interferes a light-converging member such as optical guide 62 and the back base is prevented from descending. Due to this, reliability and stability of an apparatus can be improved.

At a point of time when back base 20 comes down to the position where it is transferred to magnet 54, an unillustrated driving section stops the movement of the back base 20 by vertical scanning means 50.

When the back base 20 stops at the position where it has been transferred to magnet 54, conveyance means 40 which has shunted to the position for standby rotates again to the position of dotted line "c", so that the back base 20 and the front cover 10 are combined. After the back base 20 and the front cover 10 are re-assembled, lock pin 402c housed in elevator stand 402 ascends and a tip of the lock pin 402c is inserted in insertion hole 14 of the front cover 10. This operation locks the cassette 1 which has been in the state of lock OFF, and the lock pin enters the state of lock ON. Namely, the back base 20 and the front cover 10 enter the state wherein both of them cannot be separated from each other. After the cassette 1 enters the state of lock ON, lock pin 402c descends and is housed in the elevator stand 402 again. A means to conduct a series of operations to move the state of lock for cassette 1 from the state of lock OFF to the state of lock ON is generically called a re-assembling means.

After the re-assembling means finishes re-assembling back base 20 and front cover 10, conveyance means 40 rotates again in the direction of arrow A6 to the position of dotted line "b" and stops there. Since the action for separating back base 20 (cassette 1) from magnet 54 is conducted, being accompanied by rotational displacement as stated above, it is possible to separate the back base 20 (cassette 1) from the magnet with smaller force, compared with an occasion for separating through parallel movement. When conveyance means 40 stops at the position of dotted line "b", the state of fixing the front cover 10 by grip claws 403a and 403b is canceled, and thereby, the cassette 1 enters the state wherein it can be conveyed on the conveyance means 40.

When the state of fixing the front cover 10 is canceled, elevator stand 402 conveys the cassette 1 in the direction toward ejection outlet 4, along the conveyance means 40, and transfers the cassette 1 to ejection roller 43. After receiving the cassette 1, the ejection roller 43 conducts ejection operations until the cassette 1 is ejected completely to ejection outlet 4. After the cassette 1 is ejected to the ejection outlet 4 completely, the conveyance mechanism 40 rotates in the direction of arrow A6 to the position of dotted line "a", and stops there, and then moves to the state wherein it can receive the succeeding cassette 1.

In the present embodiment, there is provided a stacker section where 2–5 sheets of cassette 1 can be stacked on ejection outlet 4. If 1a represents the position of the cassette 1 immediately after completion of ejection to the ejection outlet 4, the cassette 1 ejected to the place of 1a falls in the direction of arrow 8A from the upper end of the cassette 1 by its empty weight, and it finally moves to the position shown with 1b. A bottom plate section of the ejection outlet 4 is inclined from the 1a side to the 1b side so that the aforesaid actions may be conducted only by empty weight of the cassette 1. Further, in order to convey the cassette 1 from the 1a side to the 1b side surely, it is possible to structure so that the total cassette 1 may move surely from the position of 1a to the position of 1b, by providing, for example, conveyance mechanism 44 that conveys the lower portion of the cassette 1 in the direction of arrow A8. The conveyance mechanism 44 can be realized by employing a belt conveyance system or a roller conveyance system. Further, it is also possible to employ the mechanism wherein cassette 1 is pushed out by an unillustrated mechanism from the 1a side to the 1b side. Fundamentally, the cassette 1 ejected from the ejection roller 43 can take any form of positional relationship in the stacker section of the ejection outlet 4, provided that the cassette 1 ejected from the ejection outlet 4 is considered not to block the outlet of the ejection roller 43.

Further, when first cassette 1 inserted in insertion inlet 3 is conveyed to the inside of the apparatus main body, the insertion inlet 3 turns into the state wherein it can accept the second cassette. When the second cassette 1 is inserted in the insertion inlet 3 under the aforesaid stated, the second cassette 1 enters the state of standby at the insertion inlet 3. After the first cassette 1 conveyed to the inside of the apparatus main body is ejected to the ejection outlet 4, the second cassette 1 which has been in the state of standby at the insertion inlet 3 acts to be conveyed to the inside of the apparatus main body. Since the second cassette 1 can be inserted in the insertion inlet 3 immediately after the first cassette 1 is conveyed to the inside of the apparatus main body as stated above (this waiting time is very short), different two cassettes can be accepted almost simultaneously. Due to this, it is possible to improve working efficiency while keeping the apparatus size to be small.

Since the ejection outlet 4 is structured in a way that 2–5 ejected cassettes 1 (hereinafter, cassette 1 ejected from the ejection outlet 4 is properly called ejected cassette 1) can be stacked, a user can insert cassette 1 after radiographing into insertion inlet 3 in succession without removing ejected cassettes 1 until the ejection outlet 4 is filled with ejected cassettes 1. Since 1–5 cassettes 1 per one inspection and 1.8 cassettes in average are used for radiographing in general, if the ejection outlet 4 is structured so that 2–5 ejected cassettes 1 may be stacked, a user is less troubled by removal of ejected cassettes 1 in the course of inspection, and operations can be conducted effectively.

If the succeeding cassette 1 is ejected from ejection outlet 4 when the stacker section of the ejection outlet 4 is filled with ejected cassettes 1, there are cause troubles that ejected cassette 1 which has already been stacked on the ejection outlet 4 is pushed out by the cassette 1 ejected newly and falls, or the cassette 1 is forced to be ejected and breakdown is caused. Therefore, an illustrated sensor or mechanism which detects whether the stacker section of ejection outlet 4 is filled with ejected cassettes 1 or not is provided to detect whether the stacker section of the ejection outlet 4 is filled with cassettes 1 or not, and when the stacker section of the ejection outlet 4 is filled with cassettes 1, it is preferable to avoid the troubles by the following means.

1) To make it impossible to insert cassette 1 in insertion inlet 3.
2) To make it impossible to take in cassette 1 to the inside of apparatus main body 2, though cassette 1 can be inserted in insertion inlet 3.
3) To make the cassette 1 to stop before reading image information, though cassette 1 inserted in insertion inlet 3 is taken to the inside of apparatus main body 2.
4) To make the cassette 1 to stop before it is ejected to the ejection outlet 4, after the cassette 1 inserted in insertion inlet 3 is taken to the inside of apparatus main body 2 and image information is read.

Further, it is preferable to notify a user by the following notifying means that the stacker section of the ejection outlet 4 is filled with ejected cassettes 1, simultaneously with taking the aforesaid measures.

1) To provide LED on apparatus main body 2 to notify a user by means of a color of LED and of a method of lighting a lamp.
2) To notify a user by displaying a message on a monitor of an unillustrated operation terminal connected to display means 80 and apparatus main body 2.
3) To notify a user by providing a cover (not shown) on insertion inlet 3 and thereby, by making it impossible to insert cassette 1 because of the closed cover.
4) To notify a user by generating a sound from apparatus main body 2 or by putting a melody on the air.

It is preferable that processing of cassette 1 which has stayed in apparatus main body 2 or at insertion inlet 3 is started again automatically when a part or the whole of the ejected cassette 1 is removed by a user, and thereby the stacker section of the ejection outlet 4 frees itself from its filled state.

Further, there is considered an occasion wherein troubles are caused and operations cannot be continued in the course of taking cassette 1 in apparatus main body 2, or in the course of conveyance operations after taking the cassette 1 in the apparatus main body 2, or in the course of reading, or in the course of ejecting the cassette 1 out of the apparatus main body 2. For example, troubles are caused on conveyance means 40 in the course of conveyance operations for cassette 1 and conveyance operations cannot be continued accordingly, or back base 20 or front cover 10 falls while the back base 20 is being transferred to vertical scanning means 50, or the front cover 10 cannot be separated from the back base 20, or the front cover 10 and the back base 20 cannot be re-assembled together.

When these troubles are caused, it is preferable to notify a user about the troubles caused in the same means as that for notifying a user that the stacker section of the ejection outlet 4 is filled with ejected cassettes 1.

When an error is caused under the state that cassette 1 can be ejected, after the cassette 1 has been conveyed to the inside of apparatus main body 2, it is preferable to eject the cassette 1 to the ejection outlet 4 without ejecting it to insertion inlet 3. The reason for the foregoing is that a user may be intending to insert succeeding cassette 1 in the insertion inlet 3, after the cassette 1 has been conveyed to the inside of apparatus main body 2.

It is also possible to investigate with an unillustrated cassette detection sensor whether the succeeding cassette 1 has been inserted in the insertion inlet 3 or not, and thereby to eject the cassette 1 to the insertion inlet 3 when cassette 1 is not detected in the insertion inlet 3.

It is also possible to change a place to which the cassette 1 is ejected, depending on how processing is advanced, such as ejecting to insertion inlet 3 when an error is caused before image information is read, or ejecting to ejection outlet 4 when an error is caused in the course of reading image information or after reading it. It is further possible to stop operations of the apparatus while the cassette 1 stays in the apparatus without being ejected.

When an error is caused, it is preferable that information to specify the cassette 1 on which the error was caused, for example, an identification number (ID number) of stimulable phosphor sheet 28 stored in code storage element 200 is displayed together with an error message on a notifying means, namely, display means 80 or on a monitor of an unillustrated operation terminal connected to apparatus main body 2 so that a user can identify the cassette 1 on which the error was caused. Further, it is naturally possible to notify only occurrence of abnormality by a notifying means such as display means 80, a monitor of an unillustrated operation terminal connected to apparatus main body 2, LED, a sound or a melody.

In particular, when ejecting the cassette 1 on which the error was caused to insertion inlet 3 or ejection outlet 4, it is preferable that an error message showing information for identifying the cassette 1 having the error generated and contents of the error is notified to a user.

When stopping operations of the apparatus while making cassette 1 to stay in the apparatus without ejecting the cassette 1 in the case of occurrence of errors, if an illustration showing where the cassette 1 (or, back base 20 or front cover 10) is stopped in the inside of the apparatus is diagramed on display means 80 or an unillustrated operation terminal, and if an instruction message showing how to take out the cassette 1 (or, back base 20 or front cover 10) stopped inside the apparatus is displayed, the cassette 1 (or, back base 20 or front cover 10) staying inside the apparatus can be taken out in a short period of time.

When an error is caused under the condition that cassette 1 cannot be ejected out, operations of the apparatus are stopped, and occurrence of the error is notified under the condition that the cassette 1 is left in the apparatus.

As an error other than those related to cassette 1 and the apparatus mechanism, there are considered electric errors, errors concerning software, communication errors and optical errors. Even in the case of occurrence of these errors, it is preferable to notify contents of the error to a user as an error message.

When the apparatus is stopped owing to conveyance troubles in the case of an apparatus used in the medical job site, it is preferable to notify the occurrence of conveyance troubles to the user and to solve the conveyance troubles immediately so that the apparatus may be restored to be used again.

However, in a conventional radiation image reading apparatus employing a stimulable phosphor, these operations for restoring from conveyance troubles have been limited to those of a service engineer. Therefore, when conveyance troubles are caused, a user has been required to call a service engineer and to stop radiographing operations until the service engineer arrives.

In the case of a copying machine and a printer, it is normal for them to be provided with a user maintenance mechanism which makes it possible for a user to solve a jam when a sheet for output is jammed. Following points are considered as reasons why the user maintenance mechanism is not realized for a radiation image reading apparatus employing a stimulable phosphor.

1) In the case of a copying machine and a printer, the assumption that a jammed sheet for output can be spoilt (can be outputted again) holds because the sheet for output is extremely inexpensive, but in the case of a radiation image reading apparatus employing a stimulable phosphor, the assumption that a stimulable phosphor can be spoilt does not hold because the stimulable phosphor sheet is extremely expensive. Due to this restriction, it is difficult to realize a mechanism for user maintenance.

2) In the case of a copying machine and a printer, copying and print out can be conducted again, even when the jammed sheet for output is spoilt. On the other hand, image information of a patient is accumulated on the stimulable phosphor sheet used for a radiation image reading apparatus. When the stimulable phosphor sheet is spoilt, the patient needs to be radiographed again, which is extremely undesirable because the patient is exposed to excessive radiation.

In the present embodiment, therefore, a user maintenance mechanism for a radiation image reading apparatus with which a user can solve conveyance troubles easily has been realized in the following way.

On the apparatus main body 2, there is provided opening and closing door 5 representing an opening and closing means that opens and closes a part of an enclosure of the apparatus main body 2, and a user can access the inside of the apparatus main body 2 by making the opening and closing door 5 to be in the state of opening. The apparatus main body 2 has thereon an opening and closing detection means (not shown) that detects whether the opening and closing door 5 is in the state of opening or in the state of closing. The opening and closing detection means can be realized, for example, by the mechanism of photo-interrupter or interlock. There is provided stopping means (not shown) that drives and stops all mechanical systems including conveyance means 40 when this opening and closing detection means detects the state of opening of the opening and closing door 5, and stops emission of laser beam B of laser scanning unit 61. Therefore, there is no fear that a user is exposed to a risk because mechanical operations are stopped by the stopping means even when the opening and closing means results in the state of opening in the course of operations of the apparatus. Though the stopping means can be controlled by software by receiving signals from the opening and closing detection means, it is preferable, from the viewpoint of safety, to structure so that power supply to an electric base plate that controls driving of mechanical system and emission of laser beam B is forcibly cut.

Further, conveyance means 40 can be rotated to the position of dotted line "d", and thereby, a user can access the inner side (vertical scanning means 50 side) of the conveyance means 40. Since a driving section (not shown) for driving elevator stand 402, width-adjusting means 401*a* and 401*b*, cassette grips 402*a* and 402*b*, grip claws 403*a* and 403*b* and lock pin 402*c* is arranged on the opening and closing door 5 side of conveyance means 40, if the conveyance means 40 is rotated to the position of dotted line "d", cassette 1 staying on the conveyance means 40 can be removed without being interrupted by this driving section.

Further, it is preferable that there is provided a means which can change manually the positions and state for elevator stand 402, width-adjusting means 401*a* and 401*b*, cassette grips 402*a* and 402*b*, grip claws 403*a* and 403*b* and lock pin 402*c*. If the means of this kind is provided, even when the upper portion of the cassette 1 interferes with insertion roller 44, ejection roller 43 and width-adjusting mechanism 44, and thereby the conveyance means 40 is unable to rotate in the direction of dotted line "d", it is possible to convey the elevator stand 402 in the direction of arrow A2 (downward) manually, and to manually cancel the state of fixing cassette 1 by grip claws 403*a* and 403*b* and by cassette grips 402*a* and 402*b*, and thereby, a user can take the cassette 1 caused troubles out of the apparatus without using special jigs under the condition that the power supply to the apparatus is cut.

Further, even when cassette 1, front cover 10 or back base 20 falls to the inside of apparatus main body 2, it is possible to pick up the fallen cassette 1, front cover 10 or back base 20 by rotating conveyance means 40 in the direction of dotted line "d".

Further, even when the apparatus is stopped under the state wherein back base 20 is attracted to magnet 54, the back base 20 can be separated from the magnet 54 by rotating conveyance means 40 in the direction of dotted line "d". In the case of the present embodiment, the back base 20 can be separated from the magnet 54 without conducting excessive operations, because the back base 20 is attracted to vertical scanning means 50 by only magnetic force.

If vertical scanning movement plate 53 of vertical scanning means 50 is structured to be capable of being moved up and down manually, the vertical scanning movement plate 53 can be moved manually to the position where back base 20 can be separated from the magnet 54 easily.

Further, if the structure is made so that the position of cassette insertion ejection section 2b can be manually changed in a easy way (for example, the structure is made so that the position of the cassette insertion ejection section 2b may be slid or rotated upward manually, or the structure is made so that rotational displacement may be conducted in the horizontal direction like a door, or the structure is made so that taking out may be conducted easily), the space to access the inside of the apparatus is broadened, resulting in easy maintenance work.

For detecting conveyance abnormalities in the course of cassette conveyance, there are provided position detecting means (not shown) such as sensors for detecting existence and positions of cassettes, at prescribed positions of width-adjusting means 401a and 401b, elevator stand 402, cassette grips 402a and 402b all constituting the mechanism relating to cassette conveyance that is conveyance means 40 and of vertical scanning movement plate 53 as well as vertical scanning rail 51 which constitute vertical scanning means 50. Further, there is also provided a position detecting means (not shown) such as a sensor for detecting a rotating position around rotating shaft 404 of the conveyance means 40, so that a range of existence of the conveyance means 40 may be specified when the conveyance means 40 rotates in a range from dotted line "a" to dotted line "c" (range of angle θ). In addition, since a jam detection means (not shown) that monitors output of these position detecting means by making them to correspond to sequence of cassette conveyance is provided, a user can detect occurrence of a jam on a real time basis by notifying to a notifying means about information relating to conveyance abnormalities detected by the jam detection means.

After being notified of conveyance abnormalities by the notifying means, the user makes the opening and closing door 5 to be in the state of opening, and thereby, the user can withdraw the stimulable phosphor sheet, or a cassette holding the stimulable phosphor sheet, or a part of the cassette holding the stimulable phosphor sheet each being jammed through the opening which is formed when the opening and closing door 5 is made to be in the state of opening.

After jam clearance is completed and the opening and closing door 5 is closed by the user, a detecting means for opening and closing detects the state of closing. After the detecting means for opening and closing detects the state of closing again after detecting the state of opening, conveyance means 40 conducts initializing operations, and in the course of the initializing operations, existence of a jam is investigated by the position detecting means and the jam detection means, then, when a jam is detected, operations of conveyance means 40 are stopped, and information showing the occurrence of jam is notified to a user through a notifying means. This makes it possible to detect whether the jam clearance was completed correctly or not, and when the jam is not settled, the apparatus is stopped to urge the user to clear the jam again.

FIG. 11 is a diagram showing another embodiment of the radiation image reading apparatus of the invention.

Since the embodiment in FIG. 11 has therein many parts or portions which are common to those in the embodiment in FIG. 6, the parts or portions which are different from those in the embodiment in FIG. 6 will be explained mainly. Incidentally, the cassette 1 used for the embodiment in FIG. 11 is the same as that used for the embodiment in FIG. 6.

The radiation image reading apparatus shown in FIG. 6 has therein insertion inlet 3 and ejection outlet 4, and cassette 1 was inserted through the insertion inlet 3 and ejected to the ejection outlet 4. The radiation image reading apparatus shown in FIG. 11 has two insertion/ejection openings 3a and 3b, and cassette 1 can be inserted in any of the two insertion/ejection openings 3a and 3b. Further, the cassette 1 inserted through the insertion/ejection opening 3a is ejected to the insertion/ejection opening 3a, and the cassette 1 inserted through the insertion/ejection opening 3b is ejected to the insertion/ejection opening 3b. Operations of conveyance means 40 are the same as those of the embodiment in FIG. 6, except the point that an ejection angle of cassette 1 is the same as an insertion angle of cassette 1. The insertion/ejection opening to which the cassette 1 that is jammed in the inside of the apparatus is to be ejected is also limited to the insertion/ejection opening to which the cassette 1 was inserted.

It is preferable that there is provided a means that prohibits insertion of succeeding cassette 1 in the insertion/ejection opening 3a after the cassette 1 inserted in the insertion/ejection opening 3a is conveyed to the inside of the apparatus main body, or a means that notifies the state where the succeeding cassette 1 cannot be inserted. As these means, it is possible to use a means that is the same as the means that is described in the embodiment in FIG. 6 and notifies that a stacker section of the ejection outlet 4 is filled with ejected cassettes.

Further, if the priority order is given to each of the two insertion/ejection openings 3a and 3b, and when cassette 1 is not inserted in the insertion/ejection opening having the higher priority order, the cassette 1 is ejected to the aforesaid insertion/ejection opening having the higher priority order. Thus, the insertion/ejection opening that is easy for a user to handle can be opened on preferential basis, and work efficiency can be improved. In this case, it is preferable to establish so that the insertion/ejection opening that is farther from the standing position of a user has the higher priority order for ejecting the cassette 1. By doing this, the insertion/ejection opening that is closer from the standing position of a user can be used on preferential basis, and work efficiency can be improved.

Insertion/ejection rollers 42a and 42b conduct both of insertion operations and ejection operations for cassette 1. width-adjusting mechanisms 47a and 47b conduct the same operations as those of the width-adjusting mechanism 47 in FIG. 6. Code reading means 45a and 45b also conduct the same operations as those of the width-adjusting mechanism 47 in FIG. 6. Code reading means 45a and 45b also conduct the same operations as those of the code reading means 45 in FIG. 6. With an exception of the aforesaid points, other operations are mostly the same as those of the radiation image reading apparatus shown in FIG. 6.

An advantage of the radiation image reading apparatus shown in FIG. 11 is that two cassettes 1 can be inserted simultaneously in two insertion/ejection openings 3a and 3b. In the case of FIG. 6, when succeeding cassette 1 is inserted in insertion/ejection openings 3 after one cassette 1 is inserted in insertion/ejection openings 3, a user has been required to wait until the cassette 1 inserted previously is conveyed to the inside of the apparatus. As stated earlier, an average number of cassettes used for one inspection is 1.8, and therefore, the radiation image reading apparatus shown in FIG. 11 into which two cassettes 1 can be inserted simultaneously has a merit in terms of waiting time, compared with the radiation image reading apparatus shown in FIG. 6.

However, the radiation image reading apparatus shown in FIG. 6 has a merit in terms of drawing out (eliminating) of the cassette 1 that has been read. In the radiation image reading apparatus shown in FIG. 11, when processed cassettes 1 are ejected to two insertion/ejection openings 3*a* and 3*b,* it is necessary to take out processed cassettes 1 ejected to the ejection openings 3*a* and 3*b,* for inserting the following cassette 1. On the other hand, in the radiation image reading apparatus shown in FIG. 6, a plurality of cassettes 1 can be stacked on ejection opening 4, and it is not necessary to take out processed cassettes 1 (ejected cassettes 1) as long as the stacker section is not filled.

FIG. 12 is a diagram showing another embodiment of the radiation image reading apparatus of the invention.

The embodiment in FIG. 12 is of the structure wherein insertion/ejection opening 3*b* is left and insertion/ejection opening 3*a* is eliminated, among two insertion/ejection openings 3*a* and 3*b* in the embodiment 2 shown in FIG. 11. Namely, the embodiment is a radiation image reading apparatus. having only one insertion/ejection opening 3*b.* Operations thereof are omitted here, because only difference is that insertion/ejection opening 3*a* is just eliminated from the embodiment in FIG. 11. Even in the case of the present embodiment, the same measure as that described above can naturally be applied to conveyance abnormalities for a cassette.

An advantage of the radiation image reading apparatus shown in FIG. 12 is that a floor space is extremely small. In ICU and an operating room, in particular, high processing capability is not required, but a small-sized apparatus is required. Therefore, an apparatus requiring a small floor space as shown in FIG. 10 is exceedingly effective. In particular, a feature that a depth of the apparatus is small is a great merit in a medical site.

FIG. 13 is a diagram showing another embodiment of the cassette. However, the cassette shown in FIG. 13 cannot be used in the radiation image reading apparatus shown in each of FIGS. 6, 11 and 12. FIGS. 14 and 15 show the radiation image reading apparatus in which the cassette shown in FIG. 13 can be used. Even in the case of the cassette of this type, the side on the cassette that holds a stimulable phosphor sheet can be called a back base and the other side can be called a front cover.

FIG. 13(A) is a front view of cassette 1K, FIG. 13(B) is a side view of cassette 1K, and FIG. 13(C) is a sectional view of cassette 1K. Cassette 1K is composed of frame 11K, cap 12 that rotates to open or close, front surface plate 13K, back base 20K and plate 29 which can be taken out or inserted in the cassette 1K. On the section of the frame 11K, there is formed recessed portion 14 that is for supporting both ends of supporting plate 27K inside the cassette 1K.

On the side view in FIG. 13(B), the side shown with arrow L1 is a front side, and the side shown with arrow L2 is a back side. Cap 12K can be opened when it is rotated in the direction of arrow N2.

Plate 29 is composed of stimulable phosphor sheet 28, lead foil 25K and supporting plate 27K, and stimulable phosphor sheet 28, lead foil 25K and supporting plate 27K are stuck each other to be united solidly. The plate 29 can be inserted in or pulled out of cassette 1K in the direction of arrow N1, by opening the cap 12K.

It is preferable that frame 11K is made of materials which can stand the great load in the case of full load radiographing such as, for example, aluminum or hard plastic, and it is preferable that front surface plate 13K is formed by a member having a relatively small radiation absorption such as, for example, aluminum or carbon-fiber-reinforced plastic.

Supporting plate 27K may be formed with ferromagnetic plastic so that it can be attracted by magnetic force to magnet 54 in FIG. 14, or the supporting plate 27K may be formed with magnesium alloy or ordinary plastic, and a ferromagnetic sheet (not shown) such as iron foil may be stuck on the reverse side thereof (the surface where stimulable phosphor sheet is not pasted).

It is also possible to employ the method to coat ferromagnetic substances on the reverse side of the supporting plate 27.

The supporting plate 27K is designed so that it can follow a plane surface formed by magnet 54, when the supporting plate 27K is attracted to the magnet 54. Namely, the supporting plate 27K has stiffness at a certain level and flexibility which makes the supporting plate 27K to follow the plane surface formed by the magnet 54. By making the supporting plate 27K to have flexibility to a certain extent as stated above, deformation and warp of the supporting plate 27K can be corrected when the supporting plate 27K follows the plane surface on the magnet 54 side, even when the supporting plate 27K is deformed or warped by aged deterioration or by how the supporting plate 27K was used. It is therefore possible to keep the surface of stimulable phosphor sheet 28 to be a plane surface constantly in the course of reading image information.

Radiographing is carried out under the circumstances that the plate 29 is housed in the cassette 1K and cap 12K is closed. Even in the case of the present embodiment, the same measure as that described above for the conveyance abnormalities of a cassette can naturally be applied.

FIG. 14 is a diagram showing another embodiment of the radiation image reading apparatus of the invention.

A difference between the embodiment in FIG. 14 and those shown in FIGS. 6 and 11 will be mainly explained. Incidentally, the cassette used in the embodiment in FIG. 14 is cassette 1K shown in FIG. 13.

There are provided two insertion openings 3*c* and 3*d* on the radiation image reading apparatus shown in FIG. 14. Explanation will be given to the occasion where cassette 1K is first loaded in the insertion openings 3*c* in the direction of arrow A1. The cassette K1 is loaded in the insertion openings 3*c* under the circumstances that the surface of the stimulable phosphor faces downward obliquely. After the cassette 1K is loaded in the insertion openings 3*c,* cap opening/closing mechanism 48*a* opens the cap 12K while holding the cassette 1K on the insertion opening 3*c.* After the cap 12K is opened, plate 29 is drawn out of the cassette 1K by plate drawing/inserting mechanism 49*a.*

Though an object to be conveyed by conveyance mechanism 402 was cassette 1 in the embodiment in each of FIGS. 6 and 11, the plate 29 is an object to be conveyed by the plate 29 in the present embodiment. Grip claws 403*a* and 403*b* fix the plate 29 on conveyance means 40 in place of cassette 1. Attention has been paid so that a mechanism may not touch the surface of the stimulable phosphor sheet 28 on the plate 29 when conveyance means 40 and other mechanisms handle the plate 29.

By means of rotational displacement in the direction of arrow A3, the conveyance means 40 conveys the plate 29 to the position where the plate 29 is transferred to vertical scanning means 50, in the same way as explained in FIG. 6. Since an object to be handled by the conveyance means 40 is not cassette 1 but is plate 29 in the present embodiment, a separating means and a re-assembling means explained in FIG. 6 do not exist.

Since the reverse side of plate 29 is a ferromagnetic body, the plate 29 is attracted to magnet 54 by magnetic force. When the plate 29 is attracted to magnet 54 by magnetic force, grip claws 403*a* and 403*b* cancel fixing of the plate 29.

Then, the conveyance means 40 conduct rotational displacement in the direction of arrow A6 and stops at the position for standby (for example, position of dotted line "b").

Reading operations and erasing operations are not explained here because they are the same as those explained in FIG. 6. After completion of erasing operations, conveyance means 40 rotates in the direction of arrow A3 from the position for standby to accept plate 29 (returns to the position of dotted line "c"). After grip claws 403a and 403b fix the plate 29 on the conveyance means 40, the conveyance means 40 rotates again in the direction of A6, and stops at the position of dotted line "a".

Next, elevator stand 402 conveys the plate 29 in the direction of A7, and transfers the plate 29 to plate drawing/inserting mechanism 49a. After the plate drawing/inserting mechanism 49a houses the plate 29 in cassette 1K, cap opening/closing mechanism 48a closes cap 12K, thus, a series of operations end.

Though there has been explained about an occasion where cassette 1K is loaded in the insertion opening 3c, the same operations are conducted even when the cassette 1K is loaded in the insertion opening 3d.

The radiation image reading apparatus of the present embodiment has a merit which is the same as that of the radiation image reading apparatus explained in the embodiment in FIG. 11.

Even in the case of the present embodiment, the same measure as that described above for the conveyance abnormalities of a plate can naturally be applied.

FIG. 15 is a diagram showing another embodiment of the radiation image reading apparatus in the invention.

The embodiment in FIG. 15 is of the structure wherein insertion opening 3d is left and insertion opening 3c is eliminated, among two insertion openings 3c and 3d in the embodiment shown in FIG. 14. Namely, the embodiment is a radiation image reading apparatus having only one insertion opening 3d. Operations thereof are omitted here, because only difference is that insertion opening 3c is just eliminated from the embodiment in FIG. 14.

The radiation image reading apparatus of the present embodiment has a merit which is the same as that of the radiation image reading apparatus explained in the embodiment in FIG. 12.

Even in the case of the present embodiment, the same measure as that described above for the conveyance abnormalities of a cassette can be applied.

Conveyance means 40 in each of embodiments shown in FIGS. 6, 11, 12, 14 and 15 has at least two types of conveyance means including a linear conveyance means employing elevator stand 402 (means for conveying objects to be conveyed such as cassette 1 and plate 29 along conveyance means 40 vertically and linearly), and a rotary conveyance means that conducts rotational displacement around rotating shaft 404 for objects to be conveyed such as cassette 1 and plate 29.

Though each of FIGS. 6, 11, 12, 14 and 15 shows an example wherein a linear conveyance means and a rotary conveyance means are realized as conveyance means 40, it is also possible, for example, to realize each of the two conveyance means including the linear conveyance means and the rotary conveyance means as a separate mechanism. For example, it is possible to structure so that the rotary conveyance means rotates separately from the rotary conveyance means.

Further, the rotational displacement means can be structured so that a part of conveyance means 40 rotates.

Furthermore, the rotary conveyance means may be structured to be divided into plural rotary conveyance means.

In the same manner as in the foregoing, the linear conveyance means may be structured to be divided into plural linear conveyance means.

Though each embodiment in FIGS. 6, 11 and 12 is structured so that front cover 10 is separated from back base 20 after back base reverse surface 210 of the back base 20 is attracted to magnet 54, it is also possible to structure so that the back base reverse surface 210 of the back base 20 is attracted to magnet 54 after the front cover 10 is separated from the back base 20.

Though each embodiment in FIGS. 6, 11 and 12 is structured so that front cover 10 is separated from back base 20 after cassette 1 is subjected to rotational displacement, it is also possible to structure so that the back base 20 only is subjected to rotational displacement after the front cover 10 is separated from the back base 20.

Though each embodiment in FIGS. 6, 11, 12, 14 and 15 is structured so that back base 20 and plate 29 are transferred to vertical scanning means 50 through the rotational displacement of conveyance means 40, it is also possible to structure so that back base 20 and plate 29 are transferred to vertical scanning means 50 through the rotational displacement of a part or the whole of the vertical scanning means 50.

In the example explained above, two plates including a front cover and a back base are in the state of engagement each other wherein they are separated from each other or re-assembled together. In addition to this, however, there may be realized a cassette wherein a front cover and a back base are always in the state of engagement, and reading of a stimulable phosphor on the back base side is made possible through "opening", and after reading, the front cover and the back base are closed to regain the state in which the stimulable phosphor is housed. The radiation image reading apparatus employing the aforesaid cassette can also be realized.

Though conveyance means 40 and vertical scanning function 50 are provided on the same base plate 71 and the base plate 71 is fixed on bottom plate 70 through vibration control rubber 72 in each embodiment in FIGS. 6, 11, 12, 14 and 15, it is also possible to provide the conveyance means 40 and vertical scanning function 50 on different base plates and to fix each of the base plates on the bottom plate 70 through vibration control rubber 72, or it is possible to provide the conveyance means 40 directly on the bottom plate 70 without controlling vibration. By doing this, it is possible to prevent that vibration caused by operations of conveyance means 40 is transferred to vertical scanning means 50.

In each embodiment in FIGS. 6, 11, 12, 14 and 15, it is also possible to structure so that back base 20 and plate 29 are attracted to vertical scanning movement plate 53 equipped with an absorption means such as vacuum or the like. In this case, back base reverse surface 210 and the reverse side of the plate 29 do not need to be a ferromagnetic body, and magnet 54 on the vertical scanning movement plate 53 is not needed.

In the embodiment in FIG. 6, it is possible either to structure so that only one of insertion inlet 3 and ejection outlet 4 of cassette insertion ejection section 2b can be removed from conveyance reading section 2a or to structure so that the position can be changed manually. Further, it is also possible either to structure so that insertion inlet 3 and ejection outlet 4 of cassette insertion ejection section 2b can be removed separately, or to structure so that the position can be changed manually.

In the embodiment in FIG. 11, it is possible either to structure so that either one of two insertion/ejection openings 3a and 3b of cassette insertion ejection section 2b only can be removed from conveyance reading section 2a or to structure so that the position can be changed manually. Further, it is also possible either to structure so that two insertion/ejection openings 3a and 3b of cassette insertion ejection section 2b can be removed separately, or to structure so that the position can be separately changed manually.

In the embodiment in FIG. 11, it is naturally possible to make the number of cassette insertion/ejection openings, for example, to be 3 or 4, although the number of 2 for cassette insertion/ejection openings is preferable because of a high cost/performance.

In the embodiment in FIG. 14, it is possible either to structure so that either one of two insertion openings 3c and 3d of cassette insertion ejection section 2b only can be removed easily from conveyance reading section 2a or to structure so that the position can be changed manually. Further, it is also possible either to structure so that two insertion openings 3c and 3d of cassette insertion ejection section 2b can be removed separately or to structure so that the position can be separately changed manually.

Even in the case of a contact conveyance method for conveying a stimulable phosphor sheet with a roller, it is naturally possible to apply the same measure as that described above to conveyance abnormalities.

Though an example to cope with conveyance abnormalities by conducting rotational displacement for conveyance means 40 in the aforesaid example, it is naturally possible to cope with them in the same way by moving the conveyance means horizontally toward the front of the apparatus. It is also possible to cope with them in the same way by using horizontal movement and rotational displacement for the conveyance means. When moving the conveyance means 40 toward the front of the apparatus through rotational displacement or horizontal movement, if at least a part of the conveyance means 40 is structured to be protruded from opening and closing door 5 to the outside of the apparatus, it is possible to secure the working space for jam clearance sufficiently, and to carry out jam clearance safely without damaging the surface of a stimulable phosphor sheet.

In the invention, as stated above, even when conveyance abnormalities are caused in the course of conveying a stimulable phosphor sheet, or a cassette holding therein a stimulable phosphor sheet, or a part of the cassette holding there a stimulable phosphor sheet in the radiation image reading apparatus that reads radiation image information from a stimulable phosphor sheet, a user can cope with the conveyance abnormalities immediately. Therefore, it is possible to carry out radiographing jobs continuously without stopping the radiographing jobs for a long time. It is further possible to restore the apparatus safely without damaging the surface of a stimulable phosphor sheet.

What is claimed is:

1. A cassette for accommodating a stimulable phosphor sheet, comprising:
   a front cover; and
   a back base having an inner surface on which the stimulable phosphor sheet is attached, wherein the front cover is placed so as to cover the inner surface of the back base and is separably re-assembled with the back base so as to form the cassette;
   wherein the back base is attracted to a rigid plane in such a way that the back base surface is brought in contact with the rigid plane.

2. The cassette of claim 1, wherein at least a part of the reverse side of the back base is a ferromagnetic body and the attraction of the back base onto the rigid plane is conducted by a magnetic force.

3. The cassette of claim 1, wherein the attraction of the back base onto the rigid plane is conducted by a suction force.

4. The cassette of claim 1, wherein when the back base is attracted to a rigid plane in such a way that the back base surface is brought in contact with the rigid plane, the back base has a flexibility to follow the flatness of the rigid plane.

5. The cassette of claim 1, wherein one of the stimulable phosphor sheet and the plate on which the stimulable phosphor sheet is attached, is adhered on the inner surface of the back base by a two-sided adhesive tape or adhesives so as to be changeable.

6. The cassette of claim 1, wherein one of the stimulable phosphor sheet and the sheet on which the stimulable phosphor sheet is adhered, is attached on the inner surface of the back base with a magnetic force.

7. The cassette of claim 1, further comprising a locking mechanism that is capable of maintaining a lock-ON condition and a lock-OFF condition alternately.

8. The cassette of claim 7, wherein the locking mechanism is comprised of a plurality of locking claws, wherein the lock-ON condition is realized when tips of the plurality of locking claws are protruded from the side surface of the back base main body, and the lock-OFF condition is realized when the tips of the plurality of locking claws are not protruded from the side surface of the back base main body.

9. The cassette of claim 7, wherein the locking mechanism is comprised of a plurality of locking claws which move to slide on the back base while keeping tips of the claws extruding from the side surface of the back base main body.

10. The cassette of claim 9, wherein the rocking claws are provided on at least a pair of side surfaces facing each other of the back base.

11. The cassette of claim 1, wherein a protruded portion is provided on an outer peripheral portion of the back base, a recessed portion is provided on a frame of the front cover, and when the front cover and the back base are re-assembled together, the protruded portion provided on the outer peripheral portion of the back base enters into the recessed portion on the frame of the front cover so as to shield light coming from outside.

12. The cassette of claim 1, wherein a protruded portion is provided on a frame of the front cover, a recessed portion is provided on an outer peripheral portion of the back base, and when the front cover and the back base are re-assembled together, the protruded portion provided on the frame of the front cover enters into the recessed portion on the outer peripheral portion of the back base so as to shield light coming from outside.

13. The cassette of claim 12, wherein an inner surface of the frame of the front cover has a slope inclined upward from the outer peripheral portion toward the inside.

14. The cassette of claim 13, wherein when the front cover and the back base is re-assembled together, a clearance of 0.2 to 2.0 mm is generated between the inner surface of the frame of the front cover and the side surface of the outer wall of the back base.

* * * * *